US012167364B2

(12) United States Patent
Gurelli et al.

(10) Patent No.: US 12,167,364 B2
(45) Date of Patent: Dec. 10, 2024

(54) INTELLIGENT REFLECTIVE SURFACE AIDED POSITIONING BY CONVEX OPTIMIZATION

(71) Applicant: QUALCOMM Incorporated, San Diego, CA (US)

(72) Inventors: Mehmet Izzet Gurelli, San Diego, CA (US); Qiang Wu, San Diego, CA (US); Junyi Li, Fairless Hills, PA (US); Tao Luo, San Diego, CA (US); Navid Abedini, Basking Ridge, NJ (US); Ozge Koymen, Princeton, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 138 days.

(21) Appl. No.: 18/049,250

(22) Filed: Oct. 24, 2022

(65) Prior Publication Data

US 2024/0137902 A1 Apr. 25, 2024
US 2024/0236926 A9 Jul. 11, 2024

(51) Int. Cl.
*H04W 64/00* (2009.01)
*G01S 5/02* (2010.01)
*H04B 7/145* (2006.01)
*H04W 56/00* (2009.01)

(52) U.S. Cl.
CPC ......... *H04W 64/003* (2013.01); *G01S 5/0221* (2013.01); *G01S 5/0273* (2013.01); *H04B 7/145* (2013.01); *H04W 56/0045* (2013.01)

(58) Field of Classification Search
CPC ............ H04W 64/003; H04W 56/0045; G01S 5/0221; G01S 5/0273; G01S 5/0218; G01S 5/10; H04B 7/145; H04B 7/04013

USPC ....................................................... 455/456.1
See application file for complete search history.

(56) References Cited

U.S. PATENT DOCUMENTS

| 8,326,318 | B2* | 12/2012 | Attar ................... G01S 13/876 |
| | | | 455/456.1 |
| 10,091,754 | B2* | 10/2018 | Miller ................. H04W 56/003 |
| 10,866,302 | B2* | 12/2020 | Wu ......................... H04W 4/33 |
| 11,026,066 | B2* | 6/2021 | Swanson ................. H04W 4/33 |
| 2002/0118723 | A1* | 8/2002 | McCrady ................ G01S 13/46 |
| | | | 455/517 |

(Continued)

FOREIGN PATENT DOCUMENTS

| EP | 2574954 A1 * | 4/2013 | ............... G01S 5/02 |
| JP | 2011257379 A * | 12/2011 | .............. G01S 11/16 |

(Continued)

*Primary Examiner* — Mahendra R Patel
(74) *Attorney, Agent, or Firm* — Holland & Hart LLP

(57) ABSTRACT

Disclosed is a method for wireless communication for determining the position of a wireless node. The method comprises receiving a set of reference signals from a set of at least four positioning devices, wherein the positioning devices are not arranged in a single plane. A signal propagation delay of each one of the set of reference signals is determined and a position of each one of the set of positioning devices is obtained. A convex localization problem is solved for the wireless node based at least in part on the determined signal propagation delay of each one of the set of reference signals and the position of each one of the set of positioning devices. The position of the wireless node is determined based at least in part on solving of the convex localization problem.

16 Claims, 13 Drawing Sheets

(56) References Cited

U.S. PATENT DOCUMENTS

| | | | | |
|---|---|---|---|---|
| 2007/0155401 | A1* | 7/2007 | Ward | H04W 64/00 455/456.1 |
| 2008/0274750 | A1* | 11/2008 | Carlson | G01S 5/12 455/456.1 |
| 2009/0097452 | A1* | 4/2009 | Gogic | H04B 7/269 370/336 |
| 2009/0322603 | A1* | 12/2009 | Liao | G01S 5/10 342/357.29 |
| 2010/0260154 | A1* | 10/2010 | Frank | G01S 5/0205 370/336 |
| 2011/0138035 | A1* | 6/2011 | Dahl | G01S 5/0081 709/224 |
| 2012/0165012 | A1* | 6/2012 | Fischer | G01S 5/10 370/328 |
| 2012/0188129 | A1* | 7/2012 | Ameti | G01S 5/02213 342/451 |
| 2016/0277893 | A1* | 9/2016 | Katabi | H04W 4/023 |
| 2019/0285722 | A1* | 9/2019 | Markhovsky | G01S 1/042 |
| 2020/0300962 | A1* | 9/2020 | Khan | H04W 64/003 |
| 2020/0371193 | A1* | 11/2020 | Marshall | G01S 5/0221 |
| 2023/0268964 | A1* | 8/2023 | Hadani | H04W 16/18 375/262 |
| 2024/0196361 | A1* | 6/2024 | Singh | G01S 5/0036 |

FOREIGN PATENT DOCUMENTS

| | | | | |
|---|---|---|---|---|
| WO | WO-2013144760 A1 | * | 10/2013 | G01S 19/215 |
| WO | WO-2016193897 A1 | * | 12/2016 | G01S 1/024 |
| WO | WO-2021221603 A1 | * | 11/2021 | G01S 5/0036 |
| WO | WO-2023030629 A1 | * | 3/2023 | G01S 1/042 |

* cited by examiner

INTELLIGENT REFLECTIVE SURFACE AIDED POSITIONING BY CONVEX OPTIMIZATION

INTRODUCTION

Aspects of the present disclosure generally relate to wireless communications, and more particularly to techniques, systems and apparatuses for localization of a wireless node.

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service, a fourth-generation (4G) service (e.g., Long Term Evolution (LTE) or WiMax), a fifth-generation (5G) service, etc. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Orthogonal Frequency Division Multiple Access (OFDMA), Time Division Multiple Access (TDMA), the Global System for Mobile access (GSM) variation of TDMA, etc.

Fifth-generation (5G) wireless standards have created new opportunities for innovation and unprecedented use cases such as enhanced mobile broadband (eMBB), ultra-low latency and high reliability (URLLC) and internet of things (IoT) (such as enhanced machine-type communications (eMTC), narrowband internet of things (NB-IoT), reduced capability (RedCap or NR-Light)). Especially IoT, for example, creates new opportunities for automation of processes such as industrial automation of production processes, warehouse management and advance in autonomous/assisted vehicular transport.

Intelligent reflective surfaces (IRSs) are surfaces with densely packed surface elements. The surface elements can be controlled, e.g., by a base station such as a gNodeB to control a phase-shift between incident and reflected signals, e.g., beams to facilitate, for example, reflect beamforming of an incident beam. For instance, IRS s may provide for better coverage where signals are attenuated or blocked between a wireless transmitter and a wireless receiver by reflecting beams to areas that otherwise would not be covered. This may be important for millimeter wave (mmWave) technology as mmWave is especially susceptible to attenuation/blockage due to the low wavelength.

Especially for 5G deployments such as IoT and/or URLLC, wireless node localization techniques are important. Known positioning systems such as the Global Positioning System (GPS) or terrestrial positioning systems, generally make use of four or more synchronized transmitters of known position. The position of a receiver device can then be determined by means of comparing signal propagation delays. However, known positioning systems are rather costly, require a lot of computational resources and/or may be inaccurate, for example. Thus, there exists a need for further improvements in wireless positioning techniques, apparatuses and systems.

SUMMARY

In some aspects of the present disclosure a method for determining a position of a wireless node in an operation area or volume is provided. The method may comprise receiving a set of reference signals from a set of at least four positioning devices, wherein the positioning devices are not arranged in a single plane, determining a signal propagation delay of each one of the set of reference signals; obtaining a position of each one of the set of positioning devices, solving a convex localization problem for the wireless node based at least in part on the determined signal propagation delay of each one of the set of reference signals and the position of each one of the set of positioning devices, and determining the position of the wireless node based at least in part on solving of the convex localization problem.

In some aspects of the present disclosure, an apparatus for determining a position of a wireless node in an operation area or volume, may comprise a memory and one or more processors coupled to the memory, the memory and the one or more processors configured to receive a set of reference signals from a set of at least four positioning devices, wherein the positioning devices are not arranged in a single plane, determine a signal propagation delay of each one of the set of reference signals, obtain a position of each one of the set of positioning devices, solve a convex localization problem for the wireless node based at least in part on the determined signal propagation delay of each one of the set of reference signals and the position of each one of the set of positioning devices, and determine the position of the wireless node based at least in part on solving of the convex localization problem.

In some aspects of the present disclosure, an apparatus for determining a position of a wireless node in an operation area or volume, may comprise means for receiving a set of reference signals from a set of at least four positioning devices, wherein the positioning devices are not arranged in a single plane, means for determining a signal propagation delay of each one of the set of reference signals, means for obtaining a position of each one of the set of positioning devices, means for solving a convex localization problem for the wireless node based at least in part on the determined signal propagation delay of each one of the set of reference signals and the position of each one of the set of positioning devices, and means for determining the position of the wireless node based at least in part on solving of the convex localization problem.

In some aspects of the present disclosure, a non-transitory computer-readable medium may store one or more instructions (e.g. a computer program) for wireless communication. The one or more instructions, when executed by one or more processors may cause the one or more processors to receive a set of reference signals from a set of at least four positioning devices, wherein the positioning devices are not arranged in a single plane, determine a signal propagation delay of each one of the set of reference signals, obtain a position of each one of the set of positioning devices, solve a convex localization problem for the wireless node based at least in part on the determined signal propagation delay of each one of the set of reference signals and the position of each one of the set of positioning devices, and determine the position of the wireless node based at least in part on solving of the convex localization problem.

In some aspects of the present disclosure a system for locating a wireless node in an operation area or volume is provided. The system may comprise at least four positioning devices, wherein each positioning devices is configured to transmit reference signals to the wireless node; and wherein the positioning devices are synchronized in time; and wherein the positioning devices are arranged such that the operation area or volume is comprised by a convex hull of the positioning devices.

In some aspects of the present disclosure a computer-implemented method for determining a set of operation positions for a set of at least four positioning devices is provided. The computer-implemented method may comprise receiving information characterizing an operation area or volume of a wireless node, and determining the set of operation positions for the set of at least four positioning devices based on the received information, such that the operation area or volume is comprised in a convex hull defined by the set of operation positions.

In some aspects of the present disclosure a method for wireless communication is provided. The method may comprise determining that a wireless node is arranged within a convex hull defined by at least four positioning devices, and selecting based on the determining a positioning procedure based on solving a convex localization problem, and determining a position of the wireless node using the selected positioning procedure.

In some aspects of the present disclosure, an apparatus for wireless communication may comprise a memory and one or more processors coupled to the memory, the memory and the one or more processors configured to determine that a wireless node is arranged within a convex hull defined by at least four positioning devices, and select based on the determining a positioning procedure based on solving a convex localization problem, and determine a position of the wireless node using the selected positioning procedure.

In some aspects of the present disclosure, an apparatus for wireless communication may comprise means for determining that a wireless node is arranged within a convex hull defined by at least four positioning devices, means for selecting based on the determining a positioning procedure based on solving a convex localization problem, and means for determining a position of the wireless node using the selected positioning procedure.

In some aspects of the present disclosure, a non-transitory computer-readable medium may store one or more instructions (e.g. a computer program) for wireless communication. The one or more instructions, when executed by one or more processors may cause the one or more processors to determine that a wireless node is arranged within a convex hull defined by at least four positioning devices, and select based on the determining a positioning procedure based on solving a convex localization problem, and determine a position of the wireless node using the selected positioning procedure.

The foregoing has outlined rather broadly the features and technical advantages of examples in accordance with the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only some typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the present disclosure are described in more detail hereinafter with reference to the accompanying drawings.

This disclosure may, however, be implemented in many different forms and should not be construed as limited to any specific structure or function presented throughout this disclosure. Rather, these aspects are provided so that this disclosure will be thorough and complete, and will fully convey the scope of the present disclosure to those skilled in the art. Based on the teachings herein one skilled in the art should appreciate that the scope of the present disclosure is intended to cover any aspect of the present disclosure disclosed herein, whether implemented independently of or combined with any other aspect of the present disclosure. For example, an apparatus may be implemented or a method may be practiced using any number of the aspects set forth herein. In addition, the scope of the present disclosure is intended to cover such an apparatus or method which is practiced using other structure, functionality, or structure and functionality in addition to or other than the various aspects of the present disclosure set forth herein. It should be understood that any aspect of the present disclosure disclosed herein may be implemented by one or more elements of a claim. While specific feature combinations are described in the following with respect to certain aspects of the present disclosure, it is to be understood that not all features of the discussed examples must be present for realizing the technical advantages of the devices, systems, methods and computer programs disclosed herein. Disclosed aspects may be modified by combining certain features of one aspect with one or more features of other aspects. A skilled person will understand that features, steps, components and/or functional elements of one aspect can be combined with compatible features, steps, components and/or functional elements of any other aspect of the present disclosure.

Several aspects of communication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies and Open RAN (O-RAN) technologies.

Figure 1:
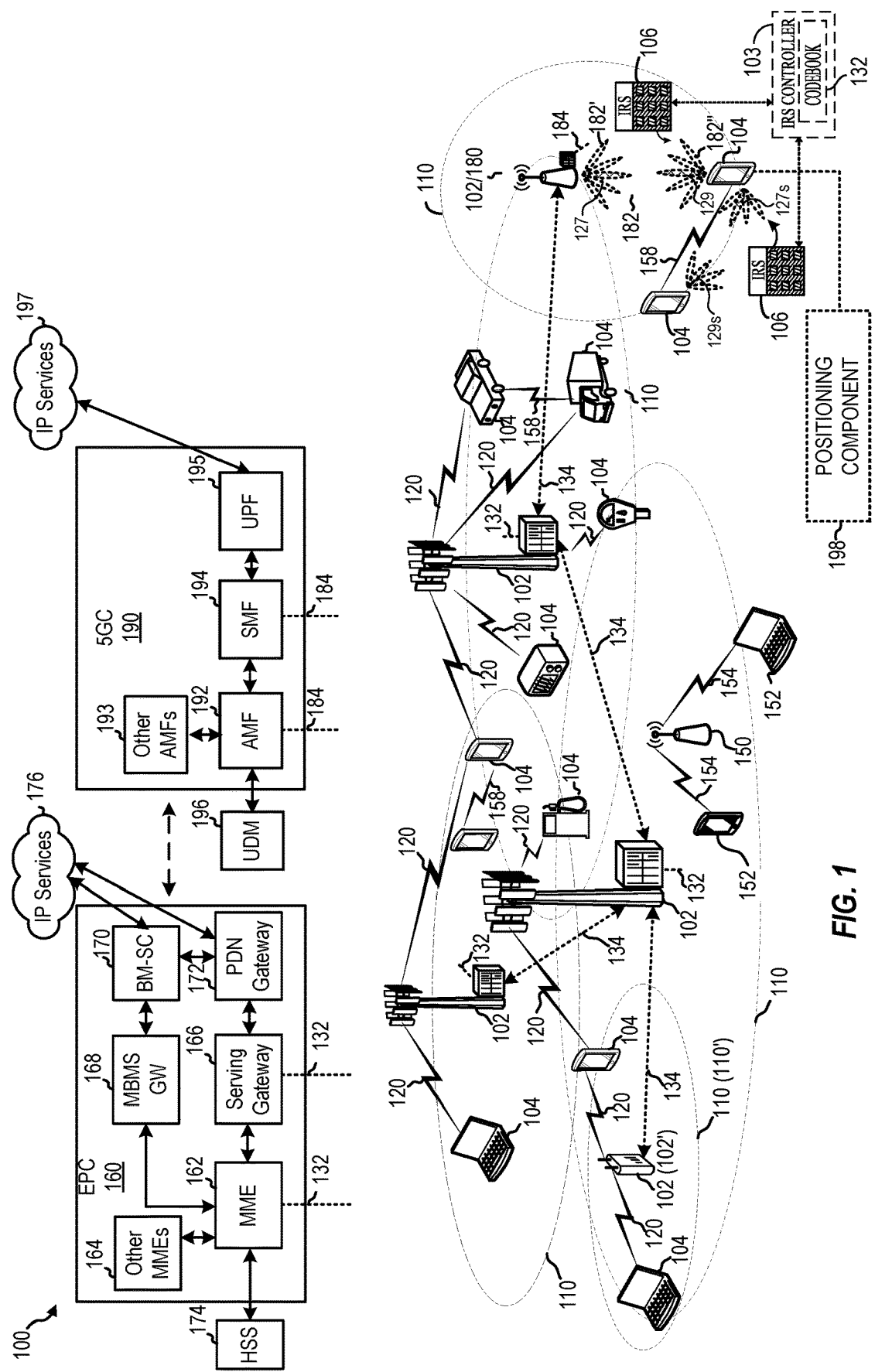
FIG. 1 is a block diagram conceptually illustrating an example wireless communication network in accordance with various aspects of the present disclosure.

FIG. 1 depicts an example of a wireless communication network 100, in which aspects described herein may be implemented.

Generally, wireless communication network 100 includes wireless nodes, such as BSs 102, UEs 104, or the like, one or more core networks, such as an Evolved Packet Core (EPC) 160 and 5G Core (5GC) network 190, which interoperate to provide wireless communications services.

As described herein, a node (which may be referred to as a node, a network node, a network entity, or a wireless node) may include, be, or be included in (e.g., be a component of) a base station (e.g., any base station described herein), a UE (e.g., any UE described herein), a network controller, an apparatus, a device, a computing system, an integrated access and backhauling (IAB) node, a distributed unit (DU), a central unit (CU), a remote unit (RU), and/or another processing entity configured to perform any of the techniques described herein. For example, a network node may be a UE. As another example, a network node may be a base station or network entity. As another example, a first network node may be configured to communicate with a second network node or a third network node. In one aspect of this example, the first network node may be a UE, the second network node may be a base station, and the third network node may be a UE. In another aspect of this example, the first network node may be a UE, the second network node may be a base station, and the third network node may be a base station. In yet other aspects of this example, the first, second, and third network nodes may be different relative to these examples. Similarly, reference to a UE, base station, apparatus, device, computing system, or the like may include disclosure of the UE, base station, apparatus, device, computing system, or the like being a network node. For example, disclosure that a UE is configured to receive information from a base station also discloses that a first network node is configured to receive information from a second network node. Consistent with this disclosure, once a specific example is broadened in accordance with this disclosure (e.g., a UE is configured to receive information from a base station also discloses that a first network node is configured to receive information from a second network node), the broader example of the narrower example may be interpreted in the reverse, but in a broad, open-ended way. The example above where a UE is configured to receive information from a base station also discloses that a first network node is configured to receive information from a second network node, where the first network node may refer to a first UE, a first base station, a first apparatus, a first device, a first computing system, a first set of one or more one or more components, a first processing entity, or the like configured to receive the information; and the second network node may refer to a second UE, a second base station, a second apparatus, a second device, a second computing system, a second set of one or more components, a second processing entity, or the like.

As described herein, communication of information (e.g., any information, signal, or the like) may be described in various aspects using different terminology. Disclosure of one communication term includes disclosure of other communication terms. For example, a first network node may be described as being configured to transmit information to a second network node. In this example and consistent with this disclosure, when the first network node is configured to transmit information to the second network node, the first network node may be configured to provide, send, output, communicate, or transmit information to the second network node. Similarly, in this example and consistent with this disclosure, when the first network node is configured to transmit information to the second network node, the second network node may be configured to receive, obtain, or decode the information that is provided, sent, output, communicated, or transmitted by the first network node.

BSs 102 may provide an access point to the EPC 160 and/or 5GC 190 for a UE 104, and may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, delivery of warning messages, among other functions. Base stations may include and/or be referred to as a gNB, NodeB, eNB, ng-eNB (e.g., an eNB that has been enhanced to provide connection to both EPC 160 and 5GC 190), an access point, a base transceiver station, a radio base station, a radio transceiver, or a transceiver function, or a transmission reception point in various contexts.

A BS, such as BS 102, may include components that are located at a single physical location or components located at various physical locations. In examples in which BS 102 includes components that are located at various physical locations, the various components may each perform various functions such that, collectively, the various components achieve functionality that is similar to a base station that is located at a single physical location. As such, a BS 102 may equivalently refer to a standalone BS or a BS including components that are located at various physical locations or virtualized locations. In some implementations, a BS 102 including components that are located at various physical locations may be referred to as or may be associated with a disaggregated radio access network (RAN) architecture, such as an Open RAN (O-RAN) or Virtualized RAN (VRAN) architecture. In some implementations, such components of a base station may include or refer to one or more of a central unit (CU), a distributed unit (DU), or a radio unit (RU).

BSs 102 wirelessly communicate with UEs 104 via communications links 120. Each of BSs 102 may provide communication coverage for a respective geographic coverage area 110, which may overlap in some cases. For example, small cell 102' (e.g., a low-power base station) may have a coverage area 110' that overlaps the coverage area 110 of one or more macrocells (e.g., high-power base stations).

The communication links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communication links 120 may use multiple-input and multiple-output (MIMO) antenna technology, including spatial multiplexing, beamforming, and/or transmit diversity in various aspects.

In certain aspects, communication between a BS 102 (e.g., next generation NodeB (gNB or gNodeB)) and a UE 104 may be blocked by obstacles (e.g., buildings, etc.) and may benefit from assistance from an IRS 106 (also referred to as a "reconfigurable intelligent surface", a "reflecting intelligent surface", a "reconfigurable impedance surface", an "intelligent reflection surface", or an "intelligent reconfigurable surface"). IRS 106 enables communications between BS 102 and UE 104 to be received and re-radiated, thereby avoiding the obstacles. For example, IRS 106 may be configured with a codebook for precoding one or more elements thereon (referred to as IRS elements) to allow a beam from one of BS 102 or UE 104 (e.g., a transmitter) to be re-radiated off the IRS to reach the other one of BS 102 or UE 104 (e.g., a receiver). The direction of the re-radiation by IRS 106 may be controlled or reconfigured by IRS controller 103 of the IRS 106.

IRS controller 103 may include a codebook 132 for applying a beamformer (e.g., precoding weights) according to IRS elements of IRS 106. Codebook 132 includes values of weights to configure each IRS element (or each group of IRS elements) to modify the radio signal re-radiated by each IRS element, such as weight shifting or changing amplitudes.

In an example, when UE 104 is the transmitter and communicates with BS 102 (e.g., over a wireless Uu interface), BS 102 is the receiver that provides IRS controller 103 feedback for selecting beamformer values for the IRS elements. Similarly, when UE 104 establishes a sidelink (e.g., PC5 interface) with another UE 104, UE 104 may be the transmitter and the other UE 104 may be the receiver that provides IRS controller 103 feedback. Codebook 132 may be generated based on specific settings of BS 102 and UE 104, and based on different parameters specific to different situations. The feedback from the receiver to IRS controller 103 allows for the selection of beamformer values for reflecting communications between the transmitter and the receiver. Other configurations in wireless communication network 100 can be similarly setup between UEs 104 and BSs 102.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player, a camera, a game console, a tablet, a smart device, a wearable device, a vehicle, an electric meter, a gas pump, a large or small kitchen appliance, a healthcare device, an implant, a sensor/actuator, a display, or other similar devices. Some of UEs 104 may be internet of things (IoT) devices (e.g., parking meter, gas pump, toaster, vehicles, mobile warehouse robots, drones, heart monitor, or other IoT devices), always on (AON) devices, or edge processing devices. UEs 104 may also be referred to more generally as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, or a client.

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, BS 180 and the UE 104 may each include a plurality of antennas, such as antenna elements, antenna panels, and/or antenna arrays to facilitate the beamforming.

In some cases, BS 180 may transmit a beamformed signal to UE 104 in one or more transmit directions 182'. UE 104 may receive the beamformed signal from BS 180 in one or more receive directions 182". UE 104 may also transmit a beamformed signal to BS 180 in one or more transmit directions 182". BS 180 may also receive the beamformed signal from UE 104 in one or more receive directions 182'. BS 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Figure 2:
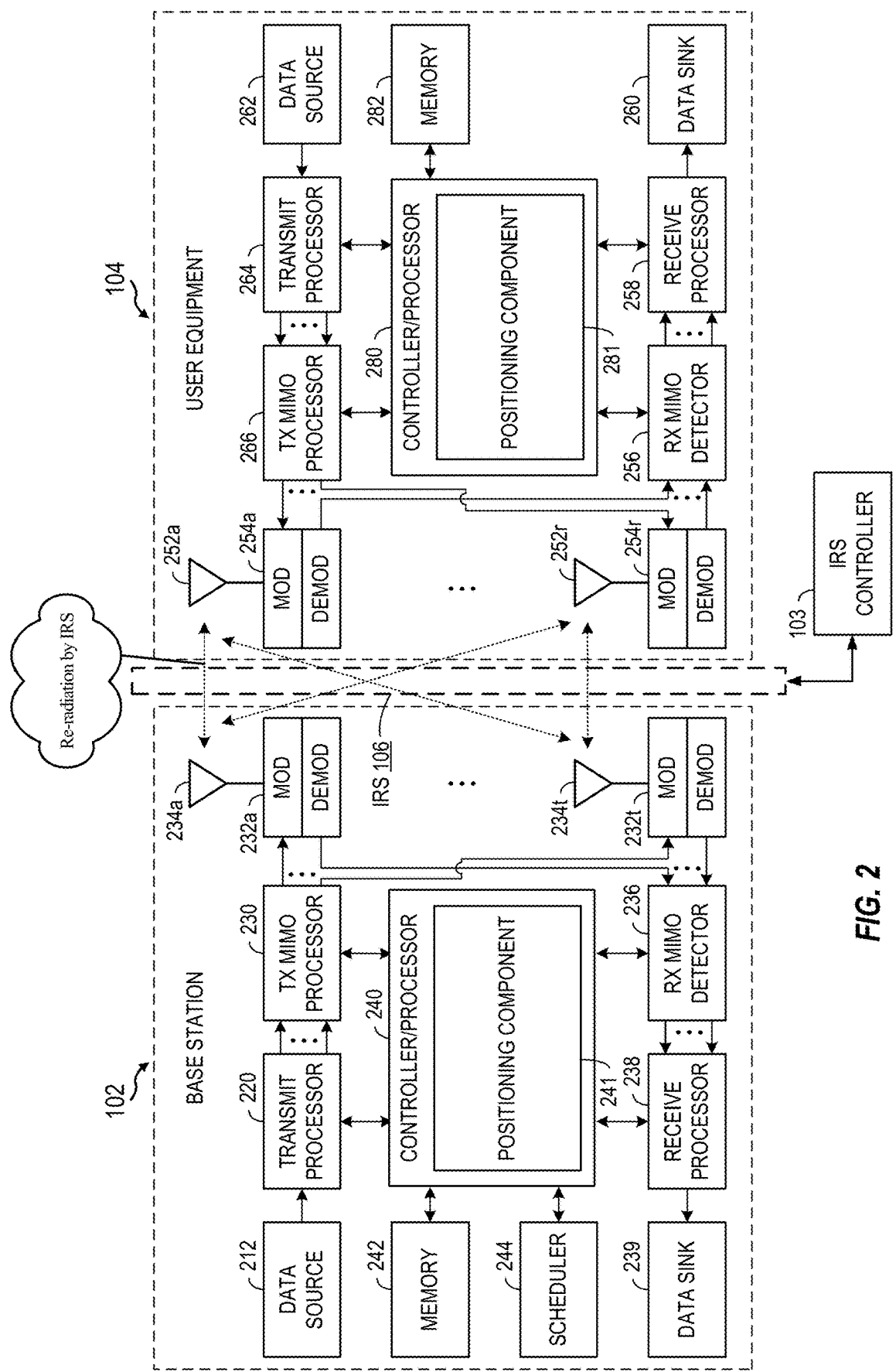
FIG. 2 is a block diagram conceptually illustrating aspects of example wireless nodes such as a base station (BS) and a user equipment (UE) in accordance with various aspects of the present disclosure.

In certain aspects, wireless communication network 100 may further include positioning components 198, which may be configured to estimate a position of the UE using signals reflected from one or more IRS s as described in more detail elsewhere herein FIG. 2 depicts aspects of an example BS 102 and an example UE 104. As shown, IRS 106 may assist the communications, by receiving and re-radiating radio signals, between BS 102 and UE 104, such as when such communications are impeded or blocked by obstacles (not shown, illustrated as the blockage in FIGS. 4A and 4B). For example, IRS 106 may re-radiate the transmissions from one of BS 102 or UE 104 to the other using reflection, refraction, or other passive or active mechanisms.

IRS 106 may be reconfigured or controlled by an IRS controller 103. Each IRS element may re-radiate radio signals with certain phase or amplitude changes, such as phase shifts. IRS controller 103 may reconfigure the phase or amplitude changes by applying a beamformer weight to each IRS element or a group of IRS elements to enable IRS 103 to re-radiate an output beam at different directions given a particular input beam. An illustrative deployment example of IRS 103 is shown in FIG. 4B.

Antennas 252, processors 266, 258, 264, and/or controller/processor 280 of UE 104 and/or antennas 234, processors 220, 230, 238, and/or controller/processor 240 of BS 102 may be used to perform the various techniques and methods described herein. Although the present disclosure uses IRS (s) as example(s) of implementing the beamformer techniques, the techniques may apply to another form of cooperative communications, such as transparent relaying or regenerative relaying implementations.

Generally, BS 102 includes various processors (e.g., 220, 230, 238, and 240), antennas 234*a-t* (collectively 234), transceivers 232*a-t* (collectively 232), which include modulators and demodulators, and other aspects, which enable wireless transmission of data (e.g., data source 212) and wireless reception of data (e.g., data sink 239). For example, BS 102 may send and receive data between itself and UE 104.

BS 102 includes controller/processor 240, which may be configured to implement various functions related to wireless communications. In the depicted example, controller/processor 240 includes positioning component 241.

Controller/processor 240 of base station 102, controller/processor 280 of UE 104, and/or any other component(s) of FIG. 2 may perform one or more techniques associated with determining a position of a wireless node in an operation area or volume, as described in more detail elsewhere herein. For example, controller/processor 280 of UE 104, and/or any other component(s) of FIG. 2 may perform or direct operations of, for example, methods disclosed herein, e.g., with reference to FIG. 12, FIG. 13, or FIG. 14 and/or other methods and processes as described herein. Memories 242 and 282 may store data and program codes for base station 102 and UE 104, respectively, such as a computer program for position determination by solving a convex optimization problem described elsewhere herein. In some aspects disclosed herein the controller/processor 280 or controller/processor 240 may determine a position of a wireless node based at least in part on solving a convex localization problem as disclosed herein, e.g. with reference to FIGS. 12 and 14.

In some aspects, a UE 104 or base station 102 may thus include means for receiving a set of reference signals from a set of at least four positioning devices, wherein the positioning devices are not arranged in a single plane, means for determining a signal propagation delay of each one of the set of reference signals, means for obtaining a position of each one of the set of positioning devices, means for solving a convex localization problem for the wireless node based at least in part on the determined signal propagation delay of each one of the set of reference signals and the position of each one of the set of positioning devices, and means for determining the position of the wireless node based at least in part on solving of the convex localization problem.

Similarly, in some aspects, a UE 104 or base station 102 may thus include a memory and one or more processors coupled to the memory, the memory and the one or more processors configured to receive a set of reference signals from a set of at least four positioning devices, wherein the positioning devices are not arranged in a single plane, determine a signal propagation delay of each one of the set of reference signals, obtain a position of each one of the set of positioning devices, solve a convex localization problem for the wireless node based at least in part on the determined signal propagation delay of each one of the set of reference signals and the position of each one of the set of positioning devices, and determine the position of the wireless node based at least in part on solving of the convex localization problem.

In some aspects, a UE 104 or base station 102 may thus comprise means for determining that a wireless node is arranged within a convex hull defined by at least four positioning devices, means for selecting based on the determining a positioning procedure based on solving a convex localization problem, and means for determining a position of the wireless node using the selected positioning procedure.

Similarly, in some aspects, a UE 104 or base station 102 may thus include a memory and one or more processors coupled to the memory, the memory and the one or more processors configured to determine that a wireless node is arranged within a convex hull defined by at least four positioning devices, and select based on the determining a positioning procedure based on solving a convex localization problem, and determine a position of the wireless node using the selected positioning procedure.

Generally, UE 104 includes various processors (e.g., 258, 264, 266, and 280), antennas 252*a-r* (collectively 252), transceivers 254*a-r* (collectively 254), which include modulators and demodulators, and other aspects, which enable wireless transmission of data (e.g., data source 262) and wireless reception of data (e.g., data sink 260).

UE 104 includes controller/processor 280, which may be configured to implement various functions related to wireless communications. In the depicted example, controller/processor 280 includes positioning component 281, which may be representative of positioning component 198 of FIG. 1. Notably, while depicted as an aspect of controller/processor 280, positioning component 281 may be implemented additionally or alternatively in various other aspects of UE 104 in other implementations.

Figure 3:
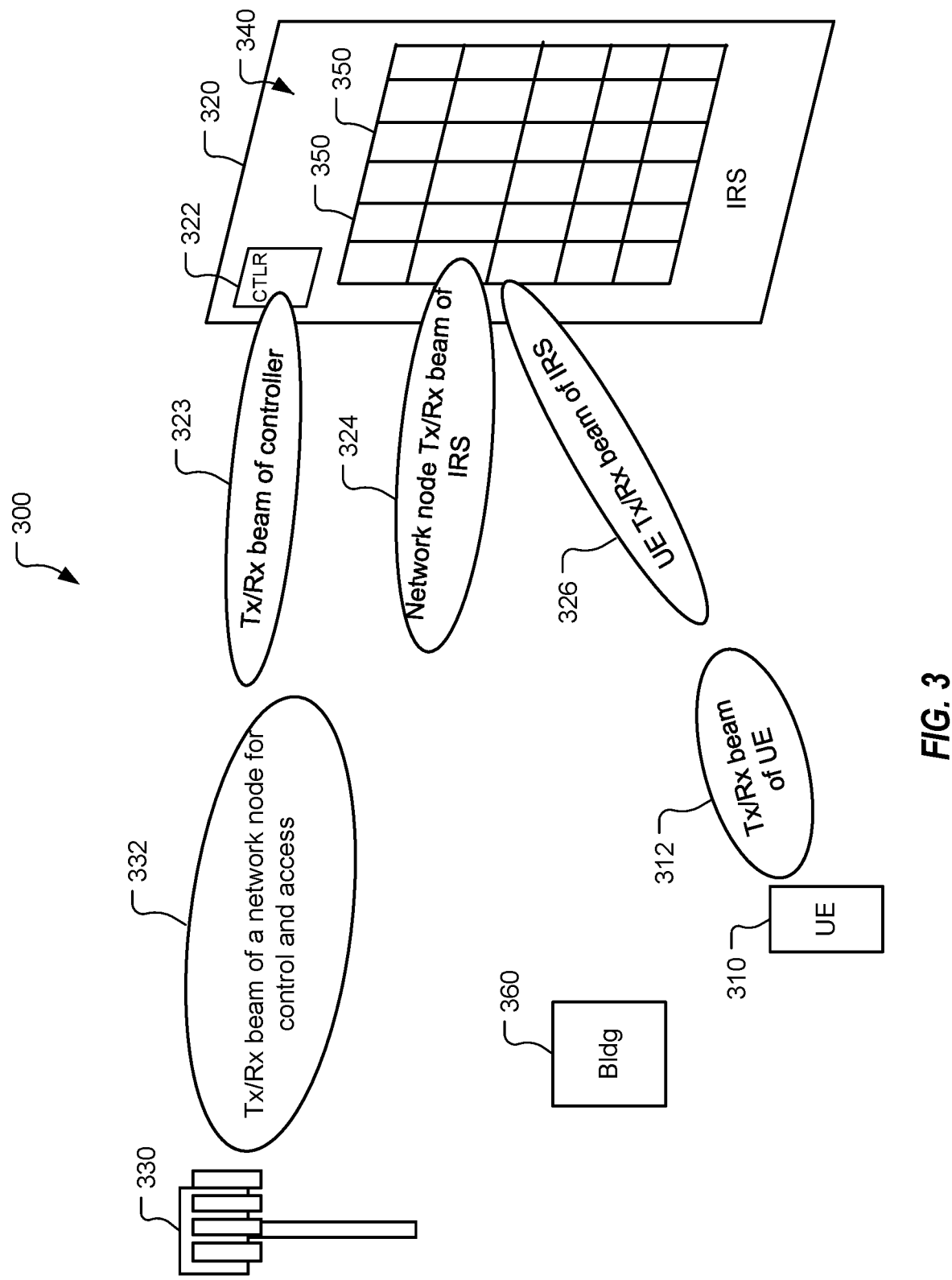
FIG. 3 is a simplified diagram of a communication environment including a BS, a UE, and an IRS in accordance with various aspects of the present disclosure.

Referring to FIG. 3, a communication environment 300 includes a UE 310, an IRS 320, a network node/BS 330, and a building 360. IRS 320 includes a surface 340 with surface elements 350, e.g., that are small and densely packed e.g., with respect to an operation wavelength of the IRS. For example, the size of the surface elements may be much smaller than the operation wavelength, e.g., about one tenth of the operation wavelength. Each surface element 350 may have a controllable reflection coefficient. By adjusting the reflection coefficient, a phase shift between an incident and a reflected ray to and from the surface element, respectively, may be controlled. The phase shift may be controlled by adjusting the reflection coefficient to adjust a beam shape and/or direction. Depending on the implementation, the surface elements 350 may also be referred to as metaatoms. The IRS 320 may be controlled by a controller 322, which may be configured based on an IRS configuration message received from the network node/BS 330. Thus, the reflection coefficient may be adjusted by the controller 322 based on one or more instructions received by the controller, e.g., in a beam 323, from the network node 330.

When the surface phase (that is, the phases of the surface elements 350) is properly set, a signal in a beam 332 from the network node 330 may be received by a beam 324 of the IRS 320 and reflected by the IRS 320 in a beam 326 toward the UE 310 in downlink and received via a beam 312 of the UE 310. In uplink, a signal may be transmitted in the beam 312 of the UE 310, received via the beam 326, reflected by the IRS 320 in the beam 324 toward the network node 330, and received via the beam 332. The IRS 320 may help to reduce pathloss and avoid blockages in line-of-sight (LOS) propagation between the network node 330 and the UE 310, e.g., due to the building 360. The network node 330 may be any of a base station, a remote radio head (RRH), a repeater, etc. The discussion herein may be described in relation to 5G and millimeter wave (mmW) bands, but the discussion is applicable to other technologies such as 4G LTE, IEEE 802.11 WIFI, or future generations of technologies including beyond 5G, 6G, etc., and to other bands such as the sub-6 GHz bands, terahertz bands, etc.

Massive multiple-input-multiple-output (MIMO) configuration increases throughput. For example, MIMO can achieve high beamforming gain by using active antenna units and can operate with individual radio frequency (RF) chains for each antenna port. To further such advantages and extend coverage, IRSs may be deployed to reflect impinging waves in desired directions. In some cases, IRSs may operate without substantial power consumption when they operate passively to only reflect or refract beams from a transmitter towards a receiver. In some cases, the reflection or refraction direction may be controlled by a network entity (e.g., base station (BS), next generation NodeB (gNB or gNodeB)) or a monitoring sidelink user equipment (UE).

Figure 4A:
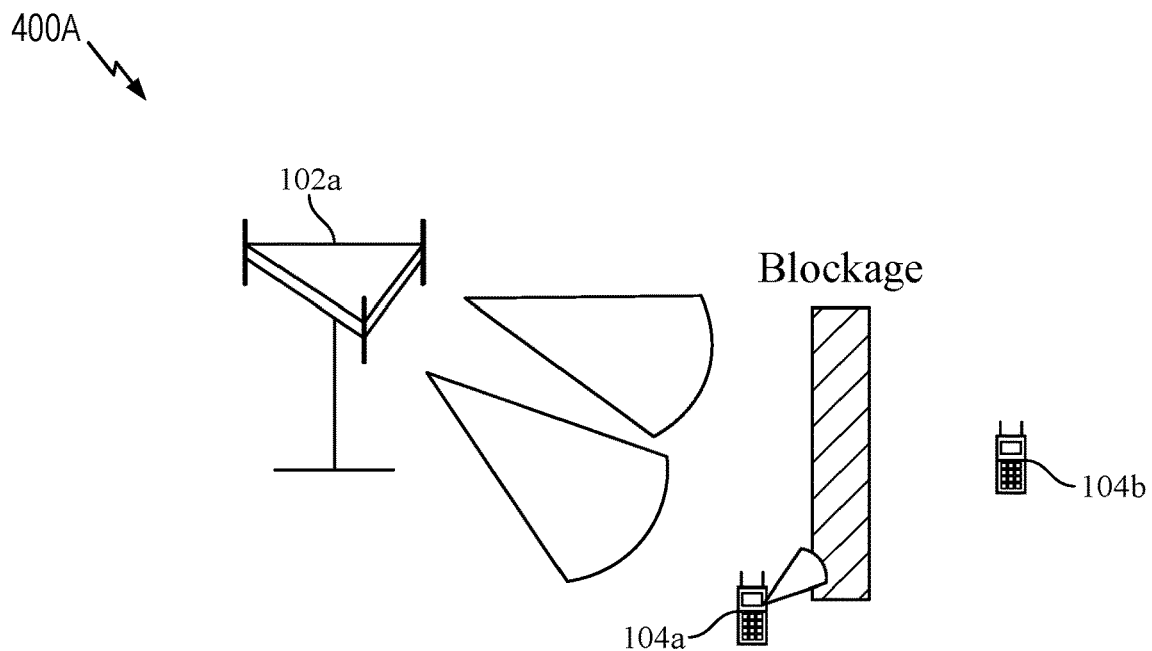
FIG. 4A illustrates an example of communication blockage between wireless communication devices, in accordance with various aspects of the present disclosure.
Figure 4B:
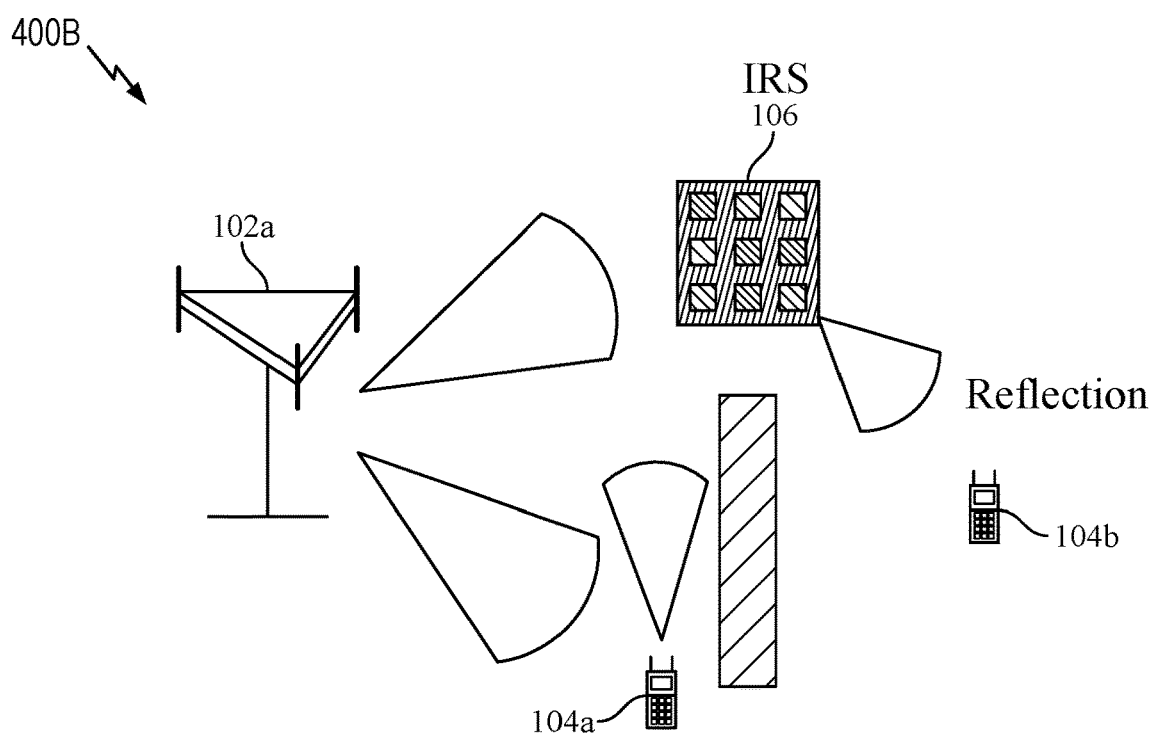
FIG. 4B illustrates an example of using an IRS to overcome impediment by obstacles between wireless nodes, in accordance with certain aspects of the present disclosure.

FIG. 4A illustrates an example 400A of communication blockage between wireless communication nodes, in accordance with certain aspects of the present disclosure. As shown, impeded by a blockage (e.g., blockages such as buildings, terrains, etc.), a network node, BS 102a (e.g., BS 102 of wireless communication network 100 of FIG. 1), can only transmit to a first UE, UE 104a, as transmissions may not reach a second UE, UE 104b, given the blockage prevents signals from reaching UE 104b. The blockage also prevents UE 104b from establishing sidelink communications with UE 104a. As such, UE 104b is prevented from communicating with BS 102a via UE 104a, using sidelink.

FIG. 4B illustrates an example 400B of using IRS 106 to overcome the blockage, in accordance with certain aspects of the present disclosure. As shown, an IRS 106 is introduced to reflect, or otherwise re-radiate, radio signals to bypass the blockage. For example, two-way communications between BS 102a and UE 104b are enabled by IRS 106 re-radiating one or more beams from BS 102a toward UE 104b, and vice versa. Furthermore, in some cases, IRS 106 is reconfigured, such as with different beamformer values, to enable UEs 104a and 104b to establish sidelink communications.

Figure 5:
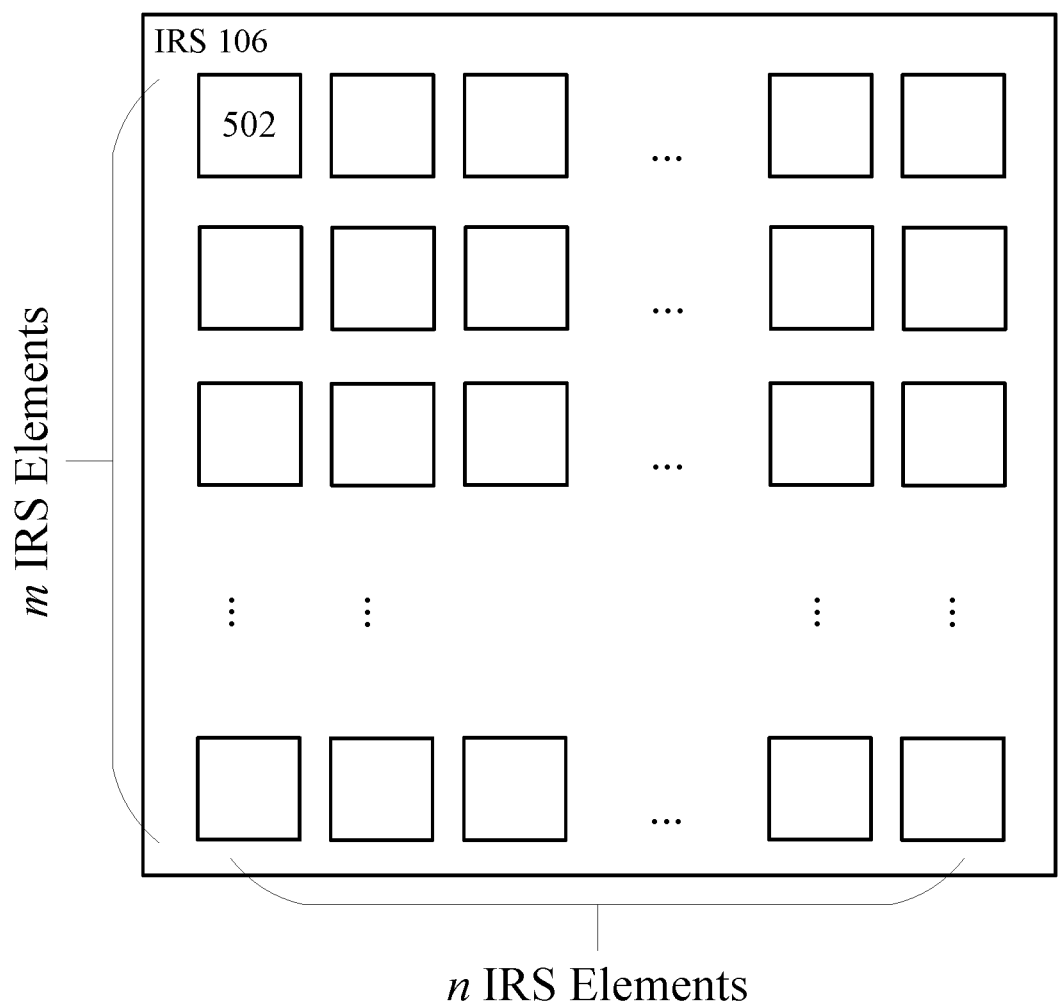
FIG. 5 illustrates an example arrangement of IRS elements, in accordance with certain aspects of the present disclosure.

FIG. 5 illustrates an example arrangement 500 of IRS elements (e.g., such as elements of IRS 106 in FIGS. 1, 2, and 4B), in accordance with certain aspects of the present disclosure. As illustrated in FIG. 5, the surface of IRS 106 consists of an array of discrete elements 502, such as an m×n rectangular matrix of discrete elements 502, that can be controlled individually or on a group level. Such elements may enable IRS 106 to perform passive beamforming. For example, IRS 106 may receive signal power from a transmitter (e.g., BS 102, UE 104a, or UE 104b) proportional to the number of IRS elements thereon. When IRS 106 reflects or refracts the radio signal, elements of IRS 106 cause phase shifts to perform conventional beamforming. The phase shifts are controlled by beamformer weights (e.g., a multiplier or an offset of time delay) applied to the elements of IRS 106. In some cases, for the array of IRS elements illustrated in FIG. 5, for example, a respective beamformer weight may be generated or specified for each of the IRS elements by the IRS controller.

Figure 6:
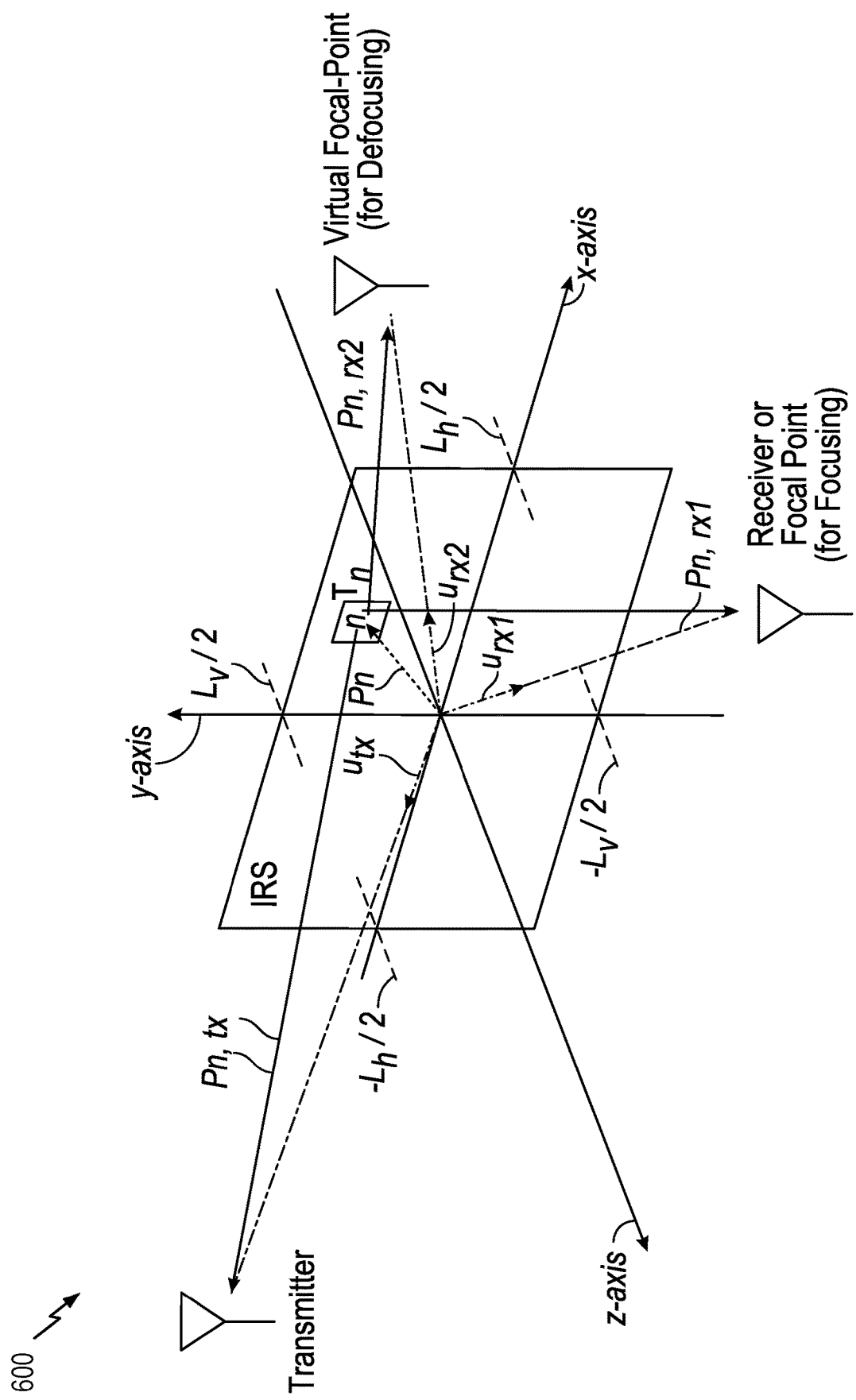
FIG. 6 is a perspective view of transmissions between a transmitter and a receiver via an IRS.

FIG. 6 is a coordinate system 600 illustrating example vectors used to compute a reflection coefficient for focusing transmitter signals at a receiver (e.g., at an estimated position of the UE for the focusing case), a real focal point (e.g., for the general case), or a virtual focal point (e.g., for the defocused case), in accordance with certain aspects of the present disclosure. The computed reflection coefficient may be used to set the surface phase for the IRS. In certain aspects, by properly setting the surface phase (e.g. the phases of surface elements), a network node's beam (e.g., gNB's beam) may be reflected from the IRS, where the surface phase is set, towards a UE (in downlink (DL)).

As illustrated in FIG. 6, a reflection coefficient, $\Gamma_n$, at surface element "n" may be computed by the following equation:

$$\Gamma_n = \exp\left(\frac{j2\pi(d_{n,tx} + d_{n,rx})}{\lambda}\right)$$

where $d_{n,tx}=|p_{n,tx}|$, $p_{n,tx}$ is the vector from surface element "n" to the transmission (tx) point, $d_{n,rx}=|p_{n,rx}|$, $p_{n,rx}$ is the vector from surface element "n" to the receiver (rx) point, and $\lambda$ is the operating wavelength. $p_{n,rx}$ may depend on whether the transmitter signals are focused at a receiver (e.g., the UE), a real focal point, or a virtual focal point. Further, as shown in FIG. 6, $p_n$ is the vector from the origin to surface element "n", $\mu_{tx}$ is the unit-vector from the origin to the tx point, and $\mu_{rx}$ is the unit-vector from the origin to the rx point. $\mu_{rx}$ may depend on whether the transmitter signals are focused at a receiver (e.g., the UE), a real focal point, or a virtual focal point. The term virtual focal point is used to mean a point behind the IRS where electromagnetic propagation appears to originate from. In other words, the term is used to mean a virtual image of a transmitter.

Beginning with the defocused case, in certain aspects, iterative methods may be used to precisely determine IRS reflection centers for one or more IRSs (e.g., an IRS reflection center per IRS, where the IRS reflection center may be different for each IRS) to be used for estimating the position of a UE.

Figure 7:
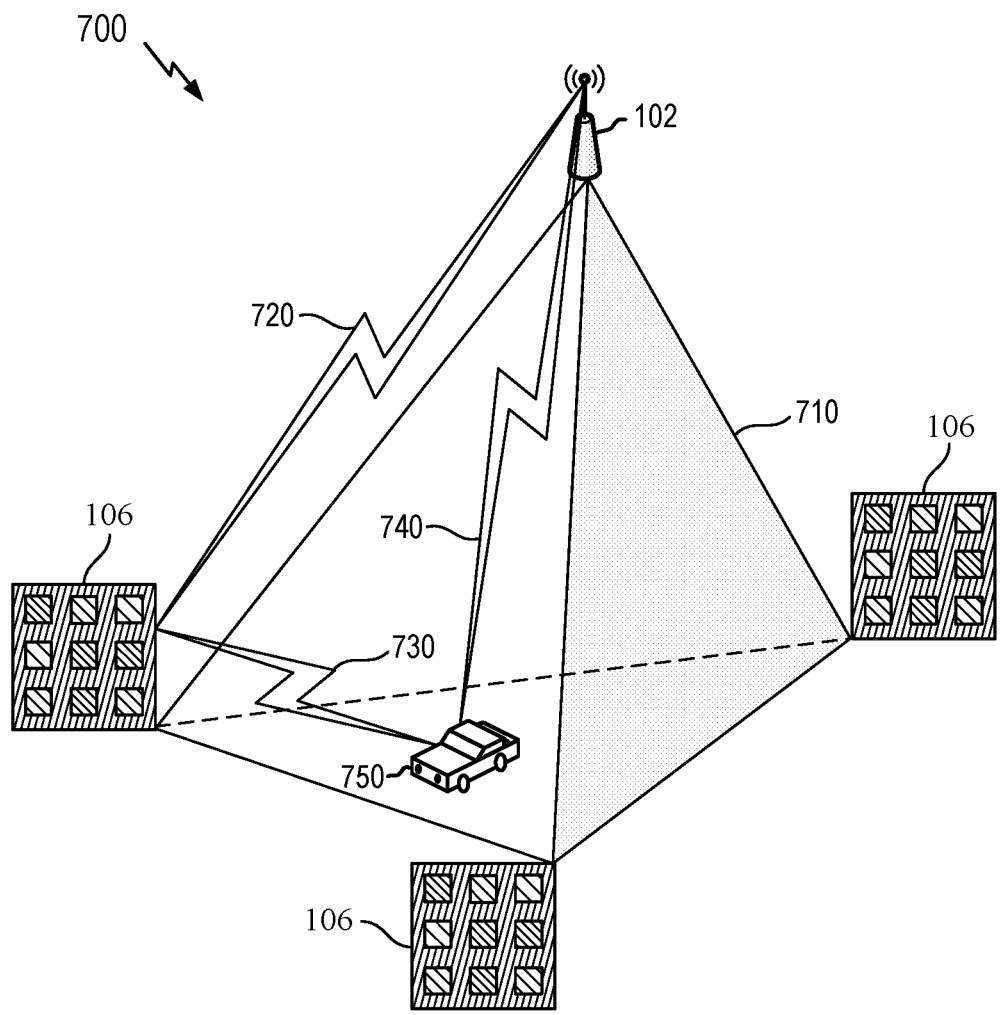
FIG. 7 illustrates a wireless positioning system according to aspects of the present disclosure.

According to FIG. 7, a wireless positioning system 700 may comprise four positioning devices 102, 106 defining a convex hull 710. A convex hull of a shape is the smallest convex set that contains the shape. For a finite set of four or more points in three-dimensional space, the convex hull generally has the shape of a polyhedron, wherein the outermost points of the finite set of four or more points define the corners of the polyhedron. According to aspects of the present disclosure, generally the positioning devices are located in a finite set of positions, wherein the positions define the convex hull.

The illustrated system 700 comprises four positioning devices which may be represented by one or more base stations 102 and/or one or more IRSs 106, wherein each positioning device 102/106 may be configured to transmit and/or reflect reference signals towards a wireless node 750 operating/moving within an operation area or volume associated with the positioning system 700. The positioning devices 102/106 may be synchronized in time.

Reference signals 720, 730, 740 transmitted to or received from the wireless node 750 may be used for determining the position of the wireless node 750 as is described in more detail elsewhere herein. The synchronization in time of the positioning devices ensures that a propagation delay of a reference signal can be calculated properly. Furthermore, if all positioning devices 102/106 are synchronized in time, the wireless node 750 only has one clock offset from the synchronized time rather than a different clock offset from each one of the positioning devices 102/106. By synchronizing the positioning devices 102/106 in time, determining the position of the wireless node 750 thus becomes more efficient.

In the depicted case, the system consists of one base station 102 and three IRSs 106. However, other system configurations are also possible, like a system comprising four base stations 102 and no IRSs 106, or a system comprising two base stations 102 and two IRSs 106, or a system comprising three base stations 102 and one IRS 106, etc. Furthermore, while the system 700 depicted in FIG. 7 comprises four positioning devices, other systems may comprise more than four positioning devices, for example six positioning devices, eight positioning devices or more than eight positioning devices, etc.

By providing IRSs, the system 700 may be made more cost efficient, as no more than one base station is needed. In some cases, it can however be advantageous to use more than one base station, e.g., to improve accuracy of the positioning method or to increase the available computational resources of the system.

In the system as depicted in FIG. 7 the convex hull 710 defined by the positioning devices 102/106 has the shape of a tetrahedron. However, other shapes are possible depending on the number of positioning devices 102/106. For example, the convex hull may have the shape of a cuboid in the case of eight positioning devices 102/106. Generally, the convex hull 710 has the shape of a convex polyhedron. Some positioning devices may also be located within the convex hull define by the positions of a subset of positioning devices.

A wireless node 750 may be located within the convex hull 710 of the positioning devices 102/106. In some aspects, the wireless node 750 may have a limited operation area or volume which may substantially be comprised within the convex hull 710 of the positioning devices 102/106. Base station 102 may communicate with the wireless node 750 directly, by sending a signal towards or receiving a signal form the wireless node 750 via direct link 740. Alternatively or additionally, base station 102 may transmit a signal towards or receive a signal form an IRS 106 via link 720, which is then reflected towards the wireless node 750 via link 730.

In some aspects, the operation area or volume of the wireless node may be comprised in a convex hull 710 defined by the positions of the set of positioning devices 102/106.

As discussed elsewhere herein, in some aspects, if the operation area or volume of wireless node 750 is comprised in the convex hull 710 of the positioning devices, a convex localization problem has only a single solution. This allows for a more precise and resource-efficient determination of the position of the wireless node 750.

In the case depicted in FIG. 7, the wireless node 750 is a vehicle for autonomous/assisted transportation. However, it is to be understood that the wireless node may alternatively be a warehouse robot, a drone, any other Internet-of-Things (IoT) device or any other mobile device capable of wireless communication.

Figure 8:
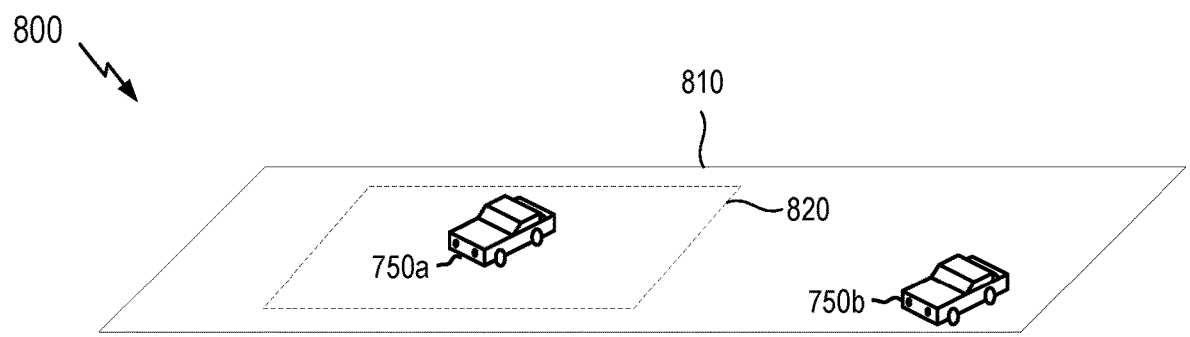
FIG. 8 shows an substantially two-dimensional operation area or volume of a wireless node according to aspects of the present disclosure.

FIG. 8 shows an substantially two-dimensional operation area 820 of a wireless node 750.

For example, a wireless node 750 may be a vehicle for autonomous/assisted transportation, or a warehouse robot, or similar. Such a wireless node 750 may have an operation area 820 which may be part of a larger area 810. Thus, wireless node 750a may be located within operation area 820, while wireless node 750b may be located in the larger area 810 but outside of the operation area 820.

Figure 9:
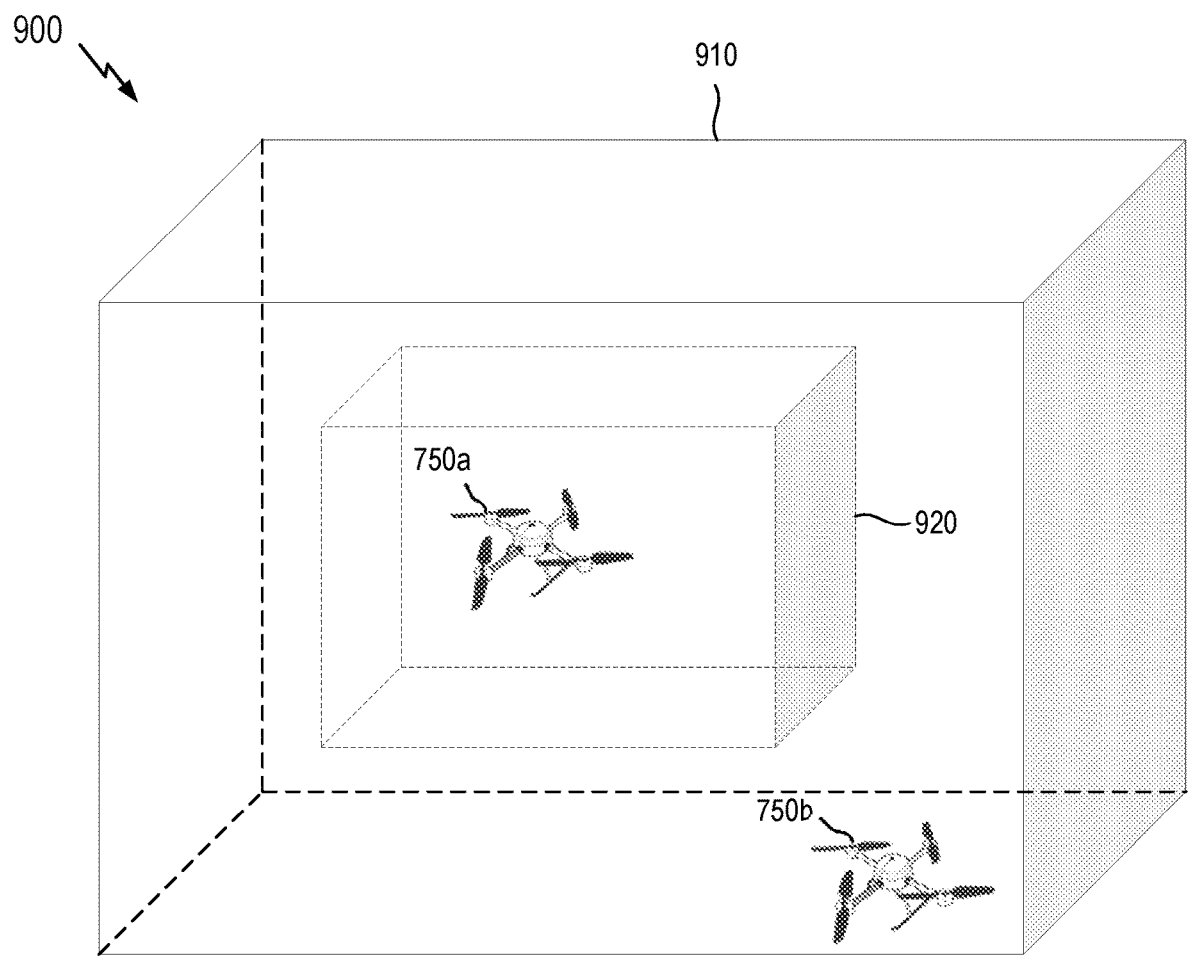
FIG. 9 shows a three-dimensional operation volume of a wireless node according to aspects of the present disclosure.

Similarly, FIG. 9 shows a wireless node which generally operates in a three-dimensional volume.

For example, a wireless node 750 may be a drone, a UE, or similar node. Such a wireless node may have an operation volume 920 which is a part of a larger volume 910. Thus, wireless node 750a may be located within operation volume 920, while wireless node 750b is located in the larger volume 910 but outside of the operation volume 920.

In some aspects, an operation area 820 or volume 920 may be a warehouse, wherein robots and/or drones are required to move things around. In other aspects, an operation area or volume may be a factory where robots or the like are utilized to manufacture goods. In yet other aspects, the operation area or volume may be a certain part of a road or city, where vehicles are required to move autonomously and/or where UEs are operated by users requiring localization.

Figure 10:
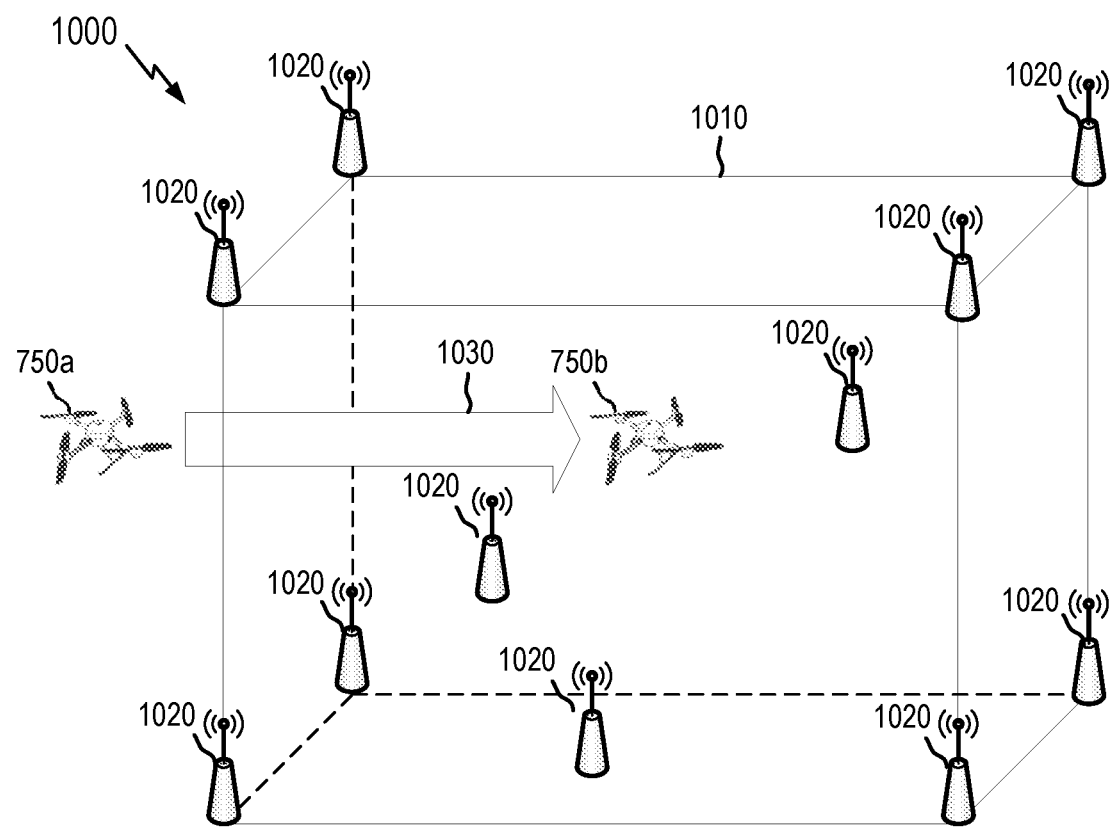
FIG. 10 illustrates a wireless node entering an operation volume associated with a wireless positioning system according to aspects of the present disclosure.

FIG. 10 illustrates a wireless node 750, such as a UE, a drone, a vehicle, a robot, etc., entering a convex hull 1010 defined by the spatial positions of eleven positioning devices 1020. According to FIG. 10, a subset of eight boundary positioning devices 1020 defines the convex hull 1010 which in the illustrated example is a cuboid. While all positioning devices herein are depicted as base stations for simplicity, it is to be understood that there may be one or more IRSs amongst the positioning devices 1020. A wireless node 750 may be located outside of the convex hull 1010, e.g., at the position of wireless node 750a. Upon movement along direction 1030, the wireless node may move towards the position of wireless node 750b and thus enter the convex hull 1010.

Upon entering the convex hull 1010, the wireless node 750 may determine that it is arranged within a convex hull 1010 defined by the positioning devices 1020. The wireless node 750 may select, based on the determining, a positioning procedure based on solving a convex localization problem. The wireless node 750 may further determine a position of the wireless node 750 using the selected positioning procedure.

This improves flexibility and localization efficiency, especially for but not limited to wireless nodes 104 that have a large operation area/volume, like in autonomous/assisted vehicular transport. By determining that a wireless node 750 is within the convex hull 1010 of respective positioning devices 1020, the localization method can be flexibly switched between conventional e.g., non-convex, localization methods and the convex methods of the present disclosure.

In some aspects, determining that the wireless node 750 is arranged within the convex hull 1010 may comprise: obtaining a set of operation positions of at least four positioning devices 1020 and an estimate of the position of the wireless node 750; and determining that the estimated position of the wireless node 750 is within the convex hull 1010 defined by the set of operation positions.

This allows for a simple and efficient way of determining that the wireless node 750 is within the convex hull defined by the set of operation positions. Literal methods for estimating a position of the device will be described in more detail below.

In some aspects, determining that the wireless node 750 is arranged within the convex hull 1010 may comprise: receiving signaling from a wireless network associated with the at least four positioning devices, wherein the signaling may comprise an indication that a positioning procedure based on solving a convex localization problem can be used.

In some cases, the positioning devices 1020 can determine that a wireless node 750 is within a convex hull 1010 of positioning devices 1020, e.g., by determining a distance between a positioning device 1020 and the wireless node 750.

In other aspects, the wireless node may determine, based on a first localization method such as GPS, that it is within the convex hull 1010 defined by positioning devices 1020 and in response switch to convex positioning using signaling of positioning devices 1020.

Figure 11A:
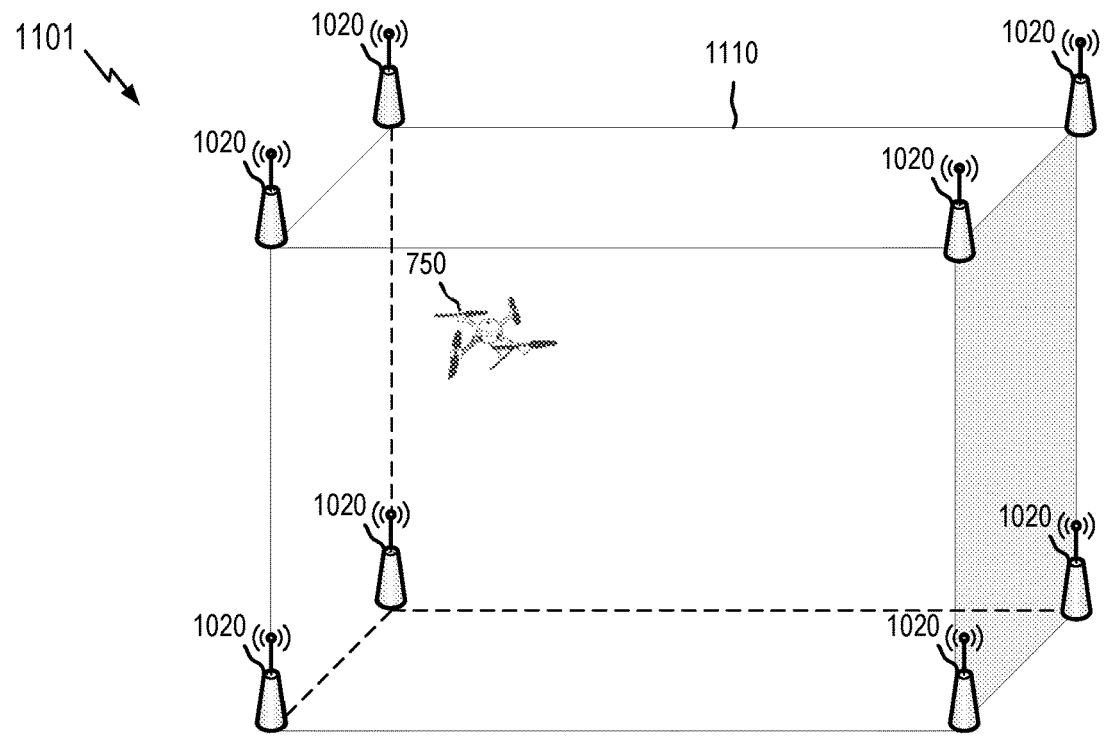
FIGS. 11A and 11B illustrate an operation area or volume of a wireless node and determined positions for a plurality of positioning devices in accordance with certain aspects of the present disclosure.

FIG. 11A illustrates an operation volume 1110 of a wireless node and determined positions for positioning devices 1020 in accordance with certain aspects of the present disclosure. In the case illustrated in FIG. 11A, the positions of the positioning devices 1020 have been chosen, e.g., via the process discussed with reference to FIG. 13, to be positioned at the corners of the cuboid operation volume 1110 of the wireless node 750. In this way, the convex hull defined by the positioning devices 1020 is equivalent to the operation volume 1110 of the wireless node 750.

Figure 11B:
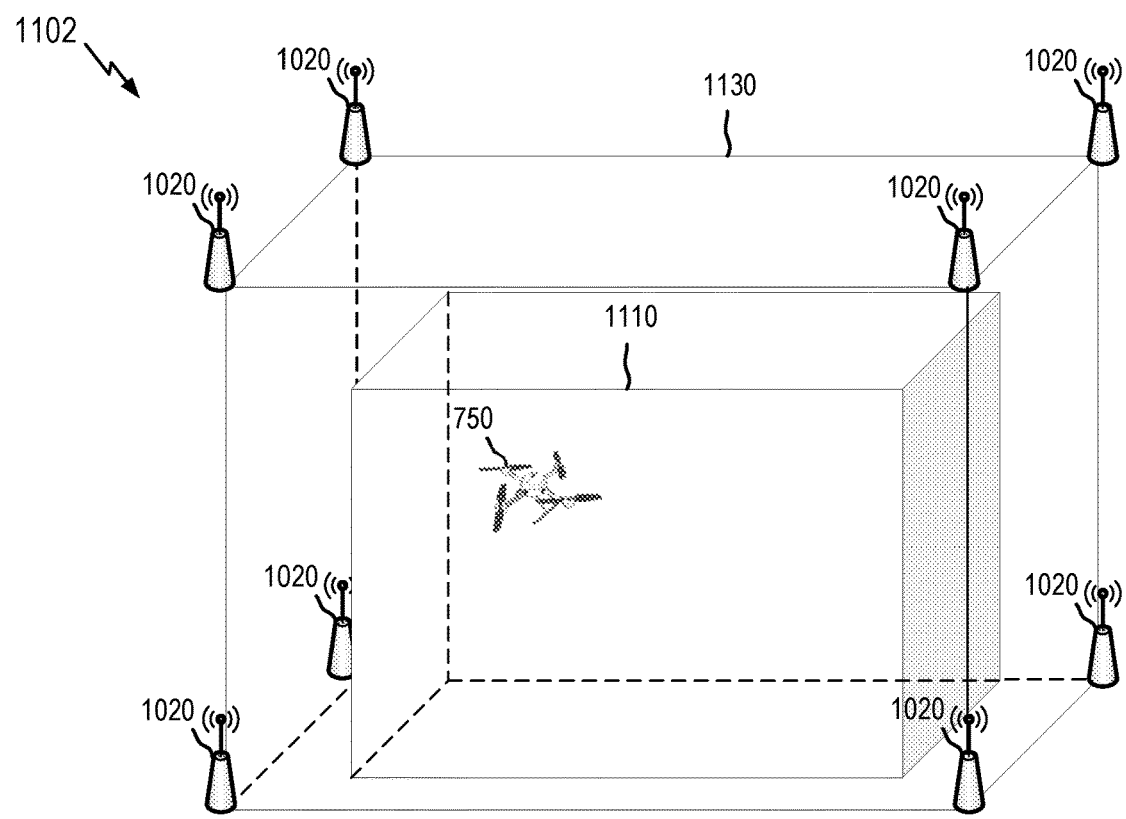

In another example, as illustrated in FIG. 11B, the positions of the positioning devices 1020 have been chosen to be outside of the operation volume 1110 of wireless node 750. In this way, the convex hull 1130 defined be the positioning devices 1020 is greater than the operation volume 1110. In this case, an excess volume of the convex hull in relation to the operation volume may be calculated as $V_{excess}=V_{ch}-V_{ov}$, with $V_{ch}$ being the volume of the convex hull 1130 and $V_{ov}$ being the volume of the operation volume 1110. In some aspects, the positions of the positioning devices may be modified, e.g., iteratively, to minimize or optimize $V_{excess}$ in accordance with further spatial constraints for the positions of the positioning devices.

Figure 12:
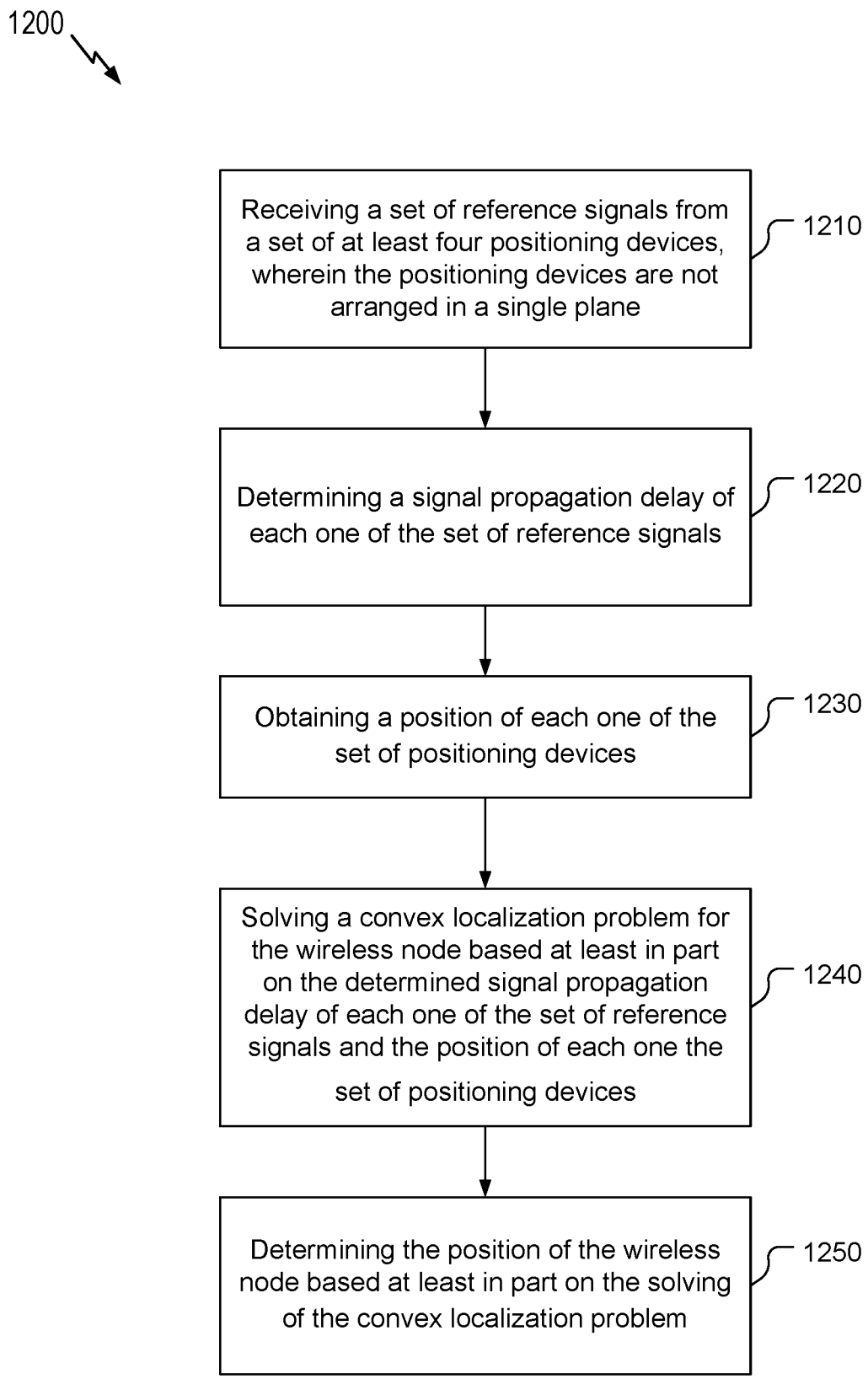
FIG. 12 is a flow diagram illustrating example operations for determining a position of a wireless node in an operation area or volume according to certain aspects of the present disclosure.

FIG. 12 is a flow diagram illustrating example operations for determining a position of a wireless node 750 in an operation area or volume according to certain aspects of the present disclosure.

According to FIG. 12, the method 1200 for determining a position of a wireless node in an operation area or volume may comprise receiving a set of reference signals from a set of at least four positioning devices, wherein the positioning devices are not arranged in a single plane (block 1210).

Such reference signals may include a position of the positioning device from which the reference signal is received. Furthermore, such a reference signal may include a time stamp, identifying the time at which the reference signal is transmitted from the positioning device. This time stamp and/or position may be utilized to formulate a convex localization problem as is described in more detail below.

As shown in FIG. 12, the method 1200 may comprise determining a signal propagation delay of each one of the set of reference signals (block 1220). This may be achieved by comparing the time at which the reference signal is received with the time stamp in the reference signal.

The signal propagation delay may be calculated as the difference between the time of transmission and the time of receipt. This signal propagation delay may be used to formulate a convex localization problem as is described in more detail below.

As also shown in FIG. 12, the method 1200 may comprise obtaining a position of each one of the set of positioning devices (block 1230).

The position of each one of the set of positioning devices may in some aspects be obtained from a memory.

This allows for improved efficiency of the localization method, especially in a setting where the positions of positioning devices are known and do not change often, e.g., in a warehouse or a factory.

In some aspects of method 1200, the positions of each one of the set of positioning devices may be received with the set of reference signals.

This allows for a more flexible approach. This may be advantageous if the invention is carried out in a more flexible environment, e.g., in autonomous/assisted vehicular transport. There it may not be feasible to store all positions in a memory, such that the more flexible and thus more efficient approach is to transmit the set of positions with the reference signals.

As further shown in FIG. 12, the method 1200 may comprise solving a convex localization problem for the wireless node based at least in part on the determined signal propagation delay of each one of the set of reference signals and the position of each one of the set of positioning devices (block 1240).

In addition, as shown in FIG. 12, the method 1200 may comprise determining the position of the wireless node based at least in part on solving of the convex localization problem (block 1250).

Casting the problem into a convex problem makes the problem much easier to solve than a non-convex optimization problem, because a convex problem allows for more different solution methods such as numeric methods. This provides for a more efficient solution of the localization problem and thus improves localization of a wireless node. Arranging the positioning devices such that they are not arranged in a single plane ensures that the convex hull defined by the positioning devices has a non-zero volume.

A convex localization problem according to the present disclosure generally has the following form $$|x-x_{b,i}|^2 \leq (\delta_i-\Delta)^2, i=1,\ldots,N$$

with x being the (unknown) position vector of the wireless node, $x_{b,i}$ being the (known) position vector of the i-th positioning device, $\delta_i$ being the signal propagation delay of the reference signal transmitted by the i-th positioning device, $\Delta$ being a clock offset of the wireless node and N being the number of positioning devices (i.e., N≥4). The clock offset of the wireless node may be 0, if the wireless node is synchronized to the positioning devices. However, if the wireless node is not synchronized with the positioning devices, there may be a non-zero clock offset.

In a conventional, non-convex approach, generally a non-convex optimization problem is utilized, i.e.:

$$|x-x_{b,i}|^2=(\delta_i-\Delta)^2, i=1,\ldots,N (\text{prior art})$$

with the same quantities as above. Thus, in this case, the solution for x refers to the intersection of spherical shells centered at $x_{b,i}$ with radius $(\delta_i-\Delta)$, while in the convex approach (as above), the spherical shells are replaced by solid spheres (for a given $\Delta$).

This process may be called as "convex relaxation". Generally, convex localization problems are much easier to solve numerically than non-convex optimization problems and thus provide for increased efficiency and reduced requirements for computational resources.

Generally, the solution to the convex localization problem yields more than one solution, i.e., the intersection of several solid spheres is—in the most general case—a three-dimensional volume.

In some aspects of method 1200, the operation area or volume may be comprised in a convex hull defined by the positions of the set of positioning devices.

If the operation area is comprised in a convex hull of the positioning devices, the convex problem only has a single solution. This allows for a more precise determination of the position while maintaining the numerical advantage of solving a convex problem. By this approach, the same solution as for the corresponding non-convex localization problem can be reached, while requiring less computational resources.

Furthermore, some measurements of propagation delay may be weak or may suffer from missed earliest arriving path, e.g., if the direct path from some positioning device to the wireless node is blocked and the reference signal reaches the wireless node by a different, longer path, e.g., due to reflection off one or more passive surfaces. Thus, the radius determined from the propagation delay of the reference signal may be larger than the direct distance from the positioning device to the wireless node. Consequently, the determined position will be inside the corresponding sphere rather than on the spherical shell.

In conventional non-convex localization methods, this case would lead to computational errors and might consequently lead to an erroneous solution, an empty set as the solution or an inconclusive solution. By solving the problem according to a convex localization method, the convex constraint is still fulfilled if the determined radius is larger than the direct distance between a positioning device and the wireless node. This avoids computational penalties as described above. Effectively, the defective measurement is ignored as it does not influence the solution of the convex localization problem.

In some aspects, the set of positioning devices may comprise: a base station; and at least three reflecting surfaces which may be configured to reflect signals transmitted by or to the base station. The positioning method may be performed by the wireless node or by the base station.

This aspect allows for reduced cost and energy consumption, as well as improved simplicity, because only one instead of four independent base station is needed. Furthermore, this provides for improved efficiency because no time synchronization between the base station is necessary. Moreover, it can be advantageous to use more than the at least four positioning devices for improved accuracy, which further improves the above-mentioned advantages of IRS s instead of active transmitters.

In some aspects, method 1200 may further comprise determining a clock offset of the wireless node in relation to a synchronized time of the set of positioning devices.

In some cases, the wireless node is not synchronized with the positioning devices. Thus, a clock offset $\Delta$ may add to the measured signal propagation delay which will lead to uncertainties in the determined localization. Thus, by determining the clock offset, uncertainties can be reduced in the localization method.

In some aspects, according to method 1200, determining the clock offset may comprise: choosing a first clock offset and a second clock offset, wherein the second clock offset may be smaller than the first clock offset; determining an estimated clock offset based on a mean value of the first clock offset and the second clock offset; solving the convex localization problem using the estimated clock offset; and if solving the convex localization problem yields a single solution, determining the position of the wireless node as the single solution; or if solving the convex localization problem yields no solution, updating the second clock offset to the estimated clock offset; or if solving the convex localization problem yields more than solution, updating the first clock offset to the estimated clock offset.

In detail, a conservatively high estimate of a clock offset is chosen, which may be called $\Delta_{high}$. Solving the convex localization problem with the estimated $\Delta_{high}$ should yield more than one solution (i.e., a region in space).

Additionally, a conservatively low clock offset is chosen, which may be called $\Delta_{low}$. In some cases, $\Delta_{low}$ may be chosen as 0. Solving the convex localization problem with the estimated $\Delta_{low}$ should yield no solution (i.e., an empty set).

Consecutively, a third value for the clock offset may be calculated as $\Delta_{mid} = (\Delta_{high} + \Delta_{low})/2$. Solving the convex relaxation problem with the calculated $\Delta_{mid}$ may yield (a) no solution, (b) one solution or (c) more than one solution, i.e., a region in space. In case (a), i.e., if the problem yields no solution, $\Delta_{mid}$ may be set as the new $\Delta_{low}$, while $\Delta_{high}$ is left unchanged and the process may be repeated. In case (b), i.e., if the problem yields exactly one solution, the clock offset $\Delta$ can be chosen as $\Delta_{mid}$ and the iteration may be exited. In case (c), i.e., if the problem yields more than one solution, $\Delta_{mid}$ may be set as the new $\Delta_{high}$, while $\Delta_{low}$ is kept unchanged, and the process may be repeated.

Determining the clock offset according to this numeric approach provides an efficient way of determining the clock offset which does not require too many computational resources.

In some aspects, solving the convex localization problem may be based on a projection onto convex sets, POCS.

The POCS method finds a solution that satisfies a set of convex constraints (assuming such a solution exists). It is an iterative method starting with a single point assumed as the solution to the convex localization problem. This single point is then updated by projection onto the convex constraints. In some cases, the original point already satisfies the constraint. In this case, the projection onto the convex set is equal to the original point. If the original point does not satisfy the convex constraint, its projection is the nearest point on the surface of the convex set. In the present case of the convex set consisting of solid spheres, this would be the point on the surface of the sphere that intersects the line from the center of the sphere to the original point. This projected point is then used as the "original point" for the next iteration. The algorithm stops when all constraints are satisfied. One way to detect the number of solutions is, to check, after all constraints are satisfied, which subset of the N inequalities of the convex relaxation problem are satisfied with equality within a predefined small error margin. If the positions of the subset of positioning devices corresponding with the subset of inequalities define a convex hull which contains the calculated solution, then the calculated solution is the (single) solution of the convex problem. If the calculated position is not within the convex hull of the subset of positioning devices, the calculated solution is one of a plurality of solutions to the convex relaxation problem.

A projection onto convex sets is an efficient method for solving a convex localization problem. This saves computational resources and thus improves efficiency of the localization method.

It is to be understood that method 1200 may be performed by the wireless node or by one of the positioning devices, e.g., by a base station. In some aspects of the present disclosure, e.g., if the wireless node is a low-complexity IoT device, the positioning method may be performed by a positioning device, e.g., a base station, because the wireless node may lack sufficient computational resources for conducting the method. In some aspects, e.g., if many wireless nodes are to be localized by one base station (and several IRS s), the method may be performed by the wireless node(s), because the base station may lack capacity for determining the positions of all wireless nodes.

Figure 13:
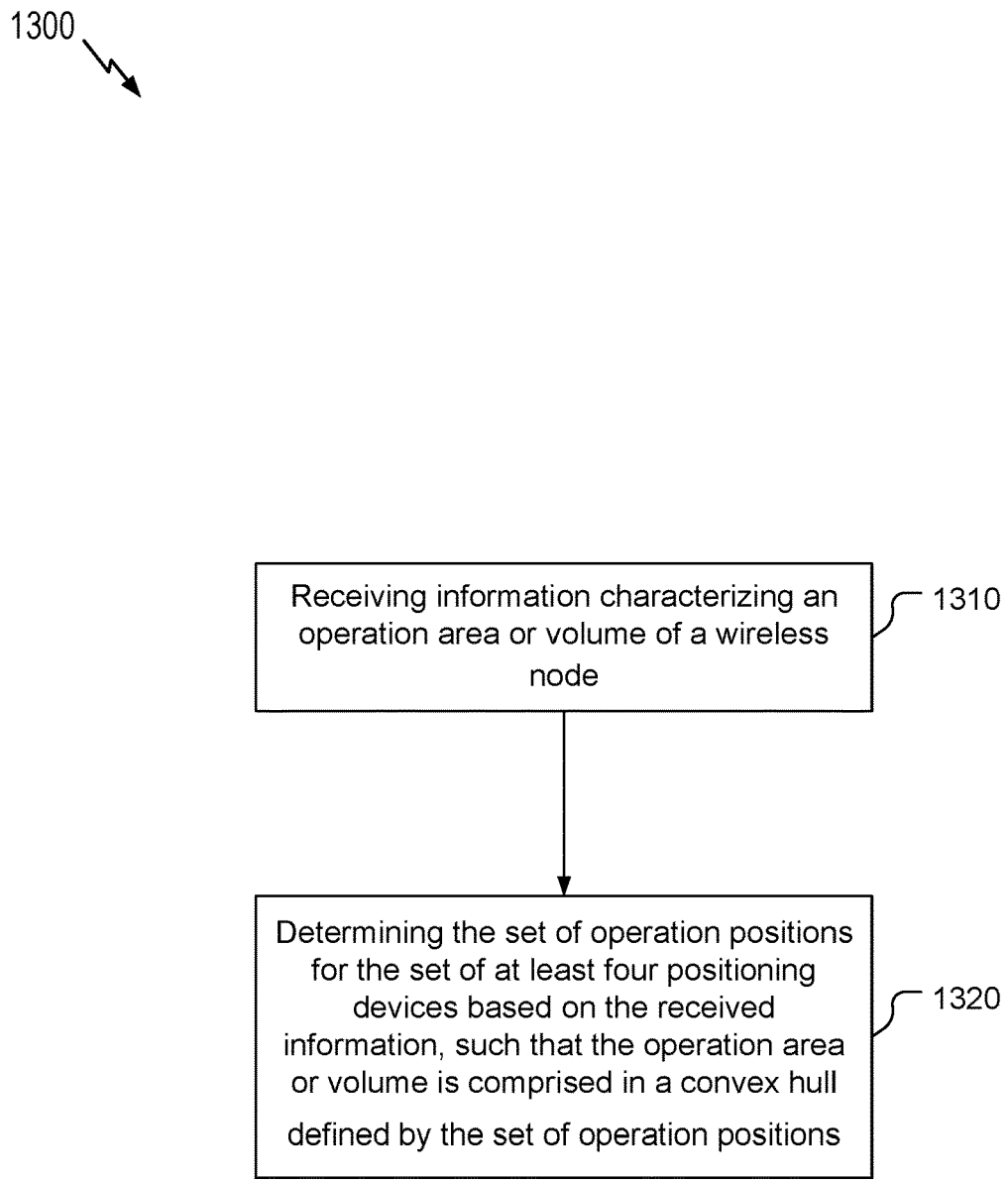
FIG. 13 is a flow diagram illustrating example operations for determining a set of operation positions for a set of at least four positioning devices according to certain aspects of the present disclosure.

As is shown in FIG. 13, a computer-implemented method 1300 for determining a set of operation positions for a set of at least four positioning devices may comprise receiving information characterizing an operation area or volume of a wireless node (block 1310).

The information may include boundaries of the operation area or volume, such as corners and/or edges of the area or volume.

As is also shown in FIG. 13, the computer-implemented method 1300 may comprise determining the set of operation positions for the set of at least four positioning devices based on the received information, such that the operation area or volume is comprised in a convex hull defined by the set of operation positions (block 1320).

This provides for a simple and efficient method of determining positions of positioning devices. By arranging the positioning devices such that the operation area or volume is comprised by a convex hull of all the positioning devices, it is ensured that a convex localization problem bears exactly one solution. Thereby, the efficiency of localizing the wireless node is improved and computational resources can be saved.

In some aspects, determining the set of operation positions for the set of at least four positioning devices may comprise: selecting, based on the received information, a set of initial positions for the set of positioning devices; calculating a convex hull for the set of initial positions; determining if the operation area or volume is comprised in the convex hull; selecting a first set of updated positions for the set of positioning devices, if the operation area or volume is not comprised in the convex hull; or determining the set of operation positions based on the set of initial positions, if the operation area or volume is comprised in the convex hull.

The convex hull may be calculated by means of convex hull algorithms, such as Graham scan, Jarvis-March, Quick-hull algorithm or Chan's algorithm or a similar algorithm.

This provides for a relatively simple, efficient and resource-saving method for determining a set of positions for positioning devices.

In some aspects, determining the set of operation positions for the set of at least four positioning devices may comprise: determining a tetrahedron or cuboid volume comprising the operation area or volume, wherein the operation positions are determined to lie at the vertices of the tetrahedron or cuboid volume.

This provides for another relatively simple and efficient and method for determining a set of positions for positioning devices. By the omission of a numerical calculation, computational resources can be saved. Furthermore, the information characterizing the operation area or volume may be used for the determination, i.e., information on corners of the operation area may be used such that the positioning devices may be placed in said corners.

In some aspects, determining the set of operation positions based on the set of initial positions may comprise: determining an excess volume of the convex hull in relation to the operation area or volume; selecting a second set of updated positions for the set of positioning devices configured to reduce the volume of the convex hull, if the excess volume is greater than a predefined threshold; and determining the set of operation positions based on the second set of updated positions.

This ensures that the convex hull does not exceed a certain predefined volume. This is useful e.g. for the implementation of mmWave technology because it only has limited range. Generally, the required transmission power can be reduced by utilizing a reasonably small distance between the positioning devices and the wireless node while still covering the complete operation area or volume.

Figure 14:
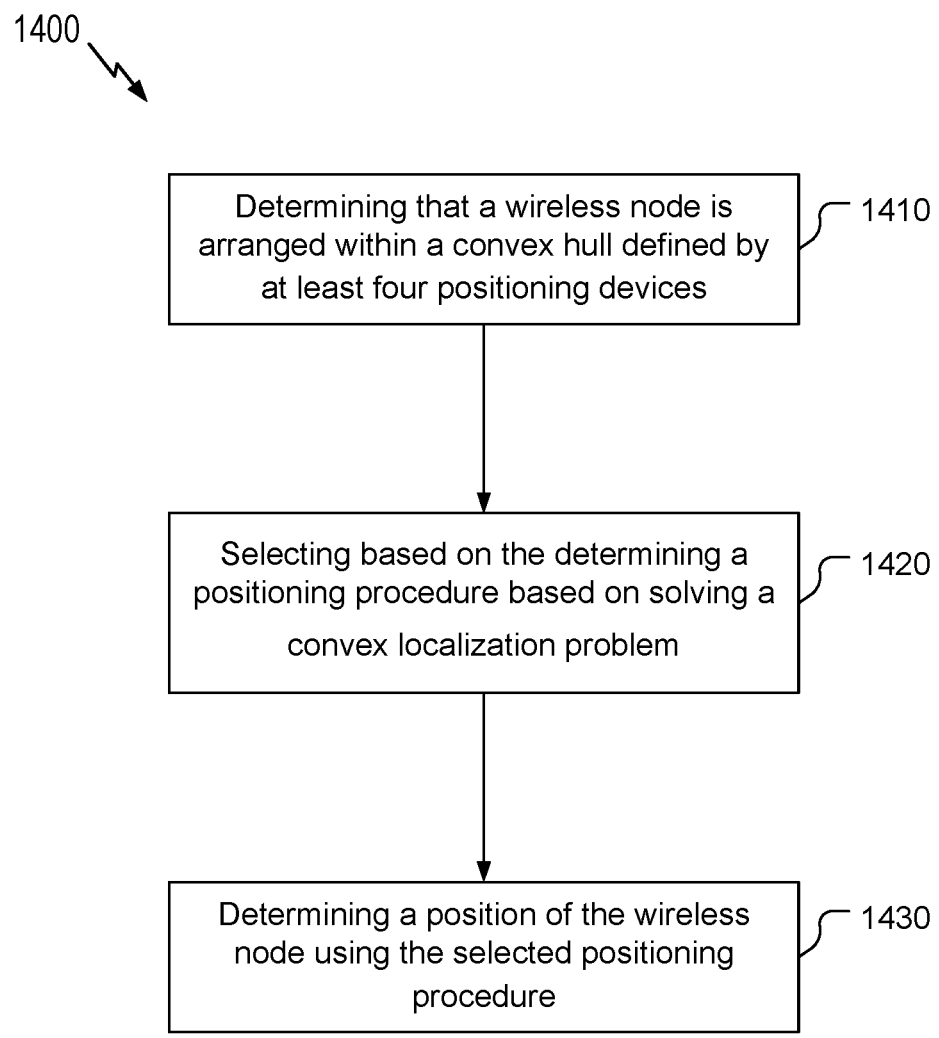
FIG. 14 is a flow diagram illustrating example operations for a method for wireless communication according to certain aspects of the present disclosure.

According to FIG. 14, a method 1400 for wireless communication is provided.

As is shown in FIG. 14, the method 1400 may comprise determining that a wireless node is arranged within a convex hull defined by at least four positioning devices (block 1410).

The determination may be based on determining a position between a positioning device and a wireless node. For example, a positioning may be placed in the center of a convex hull defined by the positions of a set of positioning devices. If the distance between said positioning device and the wireless node is below a threshold value which may be associated with the dimensions of the convex hull, it may be determined that the wireless node is located within the convex hull.

Determining that the wireless node is located within the convex hull of positioning devices allows the use of convex relaxation for determining the position of the wireless node within the convex hull.

In some aspects, determining that the wireless node is arranged within the convex hull may comprise: obtaining a set of operation positions of at least four positioning devices and an estimate of the position of the wireless node; and determining that the estimated position of the wireless node is within the convex hull defined by the set of operation positions.

This allows for a simple and efficient way of determining that the wireless node is within the convex hull defined by the set of operation positions. Literal methods for estimating a position of the device will be described in more detail below.

In some aspects, obtaining the set of operation positions of the at least four positioning devices may further comprise calculating the convex hull based on the obtained set of operation positions of the at least four positioning devices This allows for a simple way of determining that the wireless node is within the convex hull defined by the positioning devices and thus allows switching to the use of convex relaxation for positioning.

In some aspects, determining that the wireless node is arranged within the convex hull may comprise determining a position of the wireless node based on a non-convex localization method; and determining that the determined position of the wireless node is located within the convex hull defined by the at least four positioning devices.

This aspect allows flexible switching between conventional positioning methods and a positioning method based on convex relaxation according to the present disclosure.

In some aspects, the non-convex localization method may comprise satellite-based positioning.

This allows flexible switching between conventional positioning methods and a positioning method based on convex relaxation according to the present disclosure.

In some aspects, obtaining the set of operation positions of the at least four positioning devices may comprise receiving signaling from a wireless network associated with the at least four positioning devices, wherein the signaling comprises an indication of the set of operation positions of the at least four positioning devices.

This provides for a simple and efficient way of obtaining the set of operation positions. There is no need for the wireless node or the to store the operation positions, such that the method of the present disclosure can be flexibly performed in different environments.

In some aspects, determining that the wireless node is arranged within the convex hull may comprise: receiving signaling from a wireless network associated with the at least four positioning devices, wherein the signaling may comprise an indication that a positioning procedure based on solving a convex localization problem can be used.

In some cases, the positioning devices can determine that a wireless node is within a convex hull of positioning devices, e.g., by determining a distance between a positioning device and the wireless node.

As is further shown in FIG. 14, the method 1400 may comprise selecting based on the determining a positioning procedure based on solving a convex localization problem (block 1420).

Furthermore, as is shown in FIG. 14, the method 1400 may comprise determining a position of the wireless node using the selected positioning procedure (block 1430).

Selecting and using a positioning procedure based on solving a convex localization problem allows for an easier solution than a conventional non-convex optimization problem, because a convex problem allows for more different solution methods such as numeric methods. This provides for a more efficient solution of the localization problem and thus improves localization of a wireless node.

The method 1400 generally improves flexibility and localization efficiency, especially for but not limited to wireless nodes that have a large operation area/volume, like in autonomous/assisted vehicular transport. By determining that a wireless node is within the convex hull of respective positioning devices, the localization method can be flexibly switched between conventional non-convex localization methods and the convex localization method of the present disclosure.

In the following, several aspects of the present disclosure are presented:

Aspect 1. A method for determining a position of a wireless node in an operation area or volume, the method comprising: receiving a set of reference signals from a set of at least four positioning devices, wherein the positioning devices are not arranged in a single plane; determining a signal propagation delay of each one of the set of reference signals; obtaining a position of each one of the set of positioning devices; solving a convex localization problem for the wireless node based at least in part on the determined signal propagation delay of each one of the set of reference signals and the position of each one of the set of positioning devices; and determining the position of the wireless node based at least in part on solving of the convex localization problem.

Aspect 2. The method of aspect 1, wherein the operation area or volume is comprised in a convex hull defined by the positions of the set of positioning devices.

Aspect 3. The method of any one of the preceding aspects, wherein the positions of the set of positioning devices are obtained from a memory.

Aspect 4. The method of any one of the preceding aspects, wherein the set of positioning devices comprises: a base station; and at least three reflecting surfaces, configured to reflect signals transmitted by or to the base station.

Aspect 5. The method of aspect 1, wherein the positions of each one of the set of positioning devices are received with the set of reference signals.

Aspect 6. The method of any one of aspects 1 to 5, wherein solving the convex localization problem further comprises: determining a clock offset of the wireless node in relation to a synchronized time of the set of positioning devices.

Aspect 7. The method of aspect 6, wherein determining the clock offset comprises: choosing a first clock offset and a second clock offset, wherein the second clock offset is smaller than the first clock offset; determining an estimated clock offset based on a mean value of the first clock offset and the second clock offset; solving the convex localization problem using the estimated clock offset; and if solving the convex localization problem yields a single solution, determining the position of the wireless node as the single solution; or if solving the convex localization problem yields no solution, updating the second clock offset to the estimated clock offset; or if solving the convex localization problem yields more than solution, updating the first clock offset to the estimated clock offset.

Aspect 8. The method of any one of the preceding aspects, wherein solving the convex localization problem is based on a projection onto convex sets, POCS.

Aspect 9. A system for locating a wireless node in an operation area or volume, comprising: at least four positioning devices, wherein each positioning devices is configured to transmit reference signals to the wireless node; and wherein the positioning devices are synchronized in time; and wherein the positioning devices are arranged such that the operation area or volume is comprised by a convex hull of the positioning devices.

Aspect 10. The system of aspect 9, wherein the positioning devices are arranged in space to form a convex polyhedron comprising the operation area or volume.

Aspect 11. A computer-implemented method for determining a set of operation positions for a set of at least four positioning devices, comprising: receiving information characterizing an operation area or volume of a wireless node; and determining the set of operation positions for the set of at least four positioning devices based on the received information, such that the operation area or volume is comprised in a convex hull defined by the set of operation positions.

Aspect 12. The computer-implemented method of aspect 11, wherein determining the set of operation positions for the set of at least four positioning devices comprises: selecting, based on the received information, a set of initial positions for the set of positioning devices; calculating a convex hull for the set of initial positions; determining if the operation area or volume is comprised in the convex hull; selecting a first set of updated positions for the set of positioning devices, if the operation area or volume is not comprised in the convex hull; or determining the set of operation positions based on the set of initial positions, if the operation area or volume is comprised in the convex hull.

Aspect 13. The computer-implemented method of aspect 11, wherein determining the set of operation positions for the set of at least four positioning devices comprises: determining a tetrahedron or cuboid volume comprising the operation area or volume, wherein the operation positions are determined to lie at the vertices of the tetrahedron or cuboid volume.

Aspect 14. The computer-implemented method of aspect 11, wherein determining the set of operation positions based on the set of initial positions further comprises: determining an excess volume of the convex hull in relation to the operation area or volume; selecting a second set of updated positions for the set of positioning devices configured to reduce the volume of the convex hull, if the excess volume is greater than a predefined threshold; and determining the set of operation positions based on the second set of updated positions.

Aspect 15. A method for wireless communication, comprising: determining that a wireless node is arranged within a convex hull defined by at least four positioning devices, and selecting based on the determining a positioning procedure based on solving a convex localization problem, and determining a position of the wireless node using the selected positioning procedure.

Aspect 16. The method of aspect 15, wherein determining that the wireless node is arranged within the convex hull comprises: obtaining a set of operation positions of at least four positioning devices and an estimate of the position of the wireless node; and determining that the estimated position of the wireless node is within the convex hull defined by the set of operation positions.

Aspect 17. The method of aspect 16, wherein obtaining the set of operation positions of the at least four positioning devices comprises: receiving signaling from a wireless network associated with the at least four positioning devices, wherein the signaling comprises an indication of the set of operation positions of the at least four positioning devices.

Aspect 18. The method of aspect 15, wherein determining that the wireless node is arranged within the convex hull comprises: receiving signaling from a wireless network associated with the at least four positioning devices, wherein the signaling comprises an indication that a positioning procedure based on solving a convex localization problem can be used.

Aspect 19. The method of aspect 15, wherein determining that the wireless node is arranged within the convex hull comprises: determining a position of the wireless node based on a non-convex localization method; and determining that the determined position is located within a convex hull defined by the at least four positioning devices.

Aspect 20. The method of aspect 19, wherein the non-convex localization method comprises satellite-based positioning.

Aspect 21. The method of aspect 16, further comprising calculating the convex hull based on the obtained set of operation positions of the at least four positioning devices.

Aspect 22. An apparatus for determining a position of a wireless node in an operation area or volume, the apparatus comprising: a memory; and one or more processors coupled to the memory, the memory and the one or more processors configured to: receive a set of reference signals from a set of at least four positioning devices, wherein the positioning devices are not arranged in a single plane; determine a signal propagation delay of each one of the set of reference signals; obtain a position of each one of the set of positioning devices; solve a convex localization problem for the wireless node based at least in part on the determined signal propagation delay of each one of the set of reference signals and the position of each one of the set of positioning devices; and determine the position of the wireless node based at least in part on solving of the convex localization problem.

Aspect 23. The apparatus of aspect 22, wherein the operation area or volume is comprised in a convex hull defined by the positions of the set of positioning devices.

Aspect 24. The apparatus of any one of aspects 22 or 23, wherein the positions of the set of positioning devices are obtained from the memory.

Aspect 25. The apparatus of any one of aspects 22 to 24, wherein the set of positioning devices comprises: a base station; and at least three reflecting surfaces, configured to reflect signals transmitted by or to the base station.

Aspect 26. The apparatus of aspect 22, wherein the positions of each one of the set of positioning devices are received with the set of reference signals.

Aspect 27. The apparatus of any one of aspects 22 to 26, wherein the memory and the one or more processors are further configured to solve the convex localization problem based on: determining a clock offset of the wireless node in relation to a synchronized time of the set of positioning devices.

Aspect 28. The apparatus of aspect 27, wherein determining the clock offset comprises: choosing a first clock offset and a second clock offset, wherein the second clock offset is smaller than the first clock offset; determining an estimated clock offset based on a mean value of the first clock offset and the second clock offset; solving the convex localization problem using the estimated clock offset; and if solving the convex localization problem yields a single solution, determining the position of the wireless node as the single solution; or if solving the convex localization problem yields no solution, updating the second clock offset to the estimated clock offset; or if solving the convex localization problem yields more than solution, updating the first clock offset to the estimated clock offset.

Aspect 29. The apparatus of any one of aspects 22 to 28, wherein the memory and the one or more processors are further configured to solve the convex localization problem based on a projection onto convex sets, POCS.

Aspect 30. An apparatus for wireless communication, comprising: a memory; and one or more processors coupled to the memory, the memory and the one or more processors configured to: determine that a wireless node is arranged within a convex hull defined by at least four positioning devices, select based on the determining a positioning procedure based on solving a convex localization problem, and determine a position of the wireless node using the selected positioning procedure.

Aspect 31. The apparatus of aspect 30, wherein the memory and the one or more processors are further configured to determine that the wireless node is arranged within the convex hull based on: obtaining a set of operation positions of at least four positioning devices and an estimate of the position of the wireless node; and determining that the estimated position of the wireless node is within the convex hull defined by the set of operation positions.

Aspect 32. The apparatus of aspect 31, wherein the memory and the one or more processors are further configured to obtain the set of operation positions of the at least four positioning devices based on: receiving signaling from a wireless network associated with the at least four positioning devices, wherein the signaling comprises an indication of the set of operation positions of the at least four positioning devices.

Aspect 33. The apparatus of aspect 30, wherein the memory and the one or more processors are further configured to determine that the wireless node is arranged within the convex hull based on: receiving signaling from a wireless network associated with the at least four positioning devices, wherein the signaling comprises an indication that a positioning procedure based on solving a convex localization problem can be used.

Aspect 34. The apparatus of aspect 30, wherein the memory and the one or more processors are further configured to determine that the wireless node is arranged within the convex hull based on: determining a position of the wireless node based on a non-convex localization method; and determining that the determined position of the wireless node is located within the convex hull defined by the at least four positioning devices.

Aspect 35. The apparatus of aspect 34, wherein the non-convex localization method comprises satellite-based positioning.

Aspect 36. The apparatus of aspect 31, wherein the memory and the one or more processors are further configured to: calculate the convex hull based on the obtained set of operation positions of the at least four positioning devices.

Aspect 37. An apparatus for determining a position of a wireless node in an operation area or volume, the apparatus comprising: means for receiving a set of reference signals from a set of at least four positioning devices, wherein the positioning devices are not arranged in a single plane; means for determining a signal propagation delay of each one of the set of reference signals; means for obtaining a position of each one of the set of positioning devices; means for solving a convex localization problem for the wireless node based at least in part on the determined signal propagation delay of each one of the set of reference signals and the position of each one of the set of positioning devices; and means for determining the position of the wireless node based at least in part on solving of the convex localization problem.

Aspect 38. The apparatus of aspect 37, wherein the operation area or volume is comprised in a convex hull defined by the positions of the set of positioning devices.

Aspect 39. The apparatus of any one of aspects 37 or 38, wherein the positions of the set of positioning devices are obtained from the memory.

Aspect 40. The apparatus of any one of aspects 37 to 39, wherein the set of positioning devices comprises: a base station; and at least three reflecting surfaces, configured to reflect signals transmitted by or to the base station.

Aspect 41. The apparatus of aspect 37, wherein the positions of each one of the set of positioning devices are received with the set of reference signals.

Aspect 42. The apparatus of any one of aspects 37 to 41, further comprising means for determining a clock offset of the wireless node in relation to a synchronized time of the set of positioning devices.

Aspect 43. The apparatus of aspect 42, wherein the means for determining the clock offset are configured to: choose a first clock offset and a second clock offset, wherein the second clock offset is smaller than the first clock offset; determine an estimated clock offset based on a mean value of the first clock offset and the second clock offset; solve the convex localization problem using the estimated clock offset; and if solving the convex localization problem yields a single solution, determine the position of the wireless node as the single solution; or if solving the convex localization problem yields no solution, update the second clock offset to the estimated clock offset; or if solving the convex localization problem yields more than solution, update the first clock offset to the estimated clock offset.

Aspect 44. The apparatus of any one of aspects 37 to 43, wherein the means for solving the convex localization problem are configured to solve the convex localization problem based on a projection onto convex sets, POCS.

Aspect 45. An apparatus for wireless communication, comprising: means for determining that a wireless node is arranged within a convex hull defined by at least four positioning devices, means for selecting based on the determining a positioning procedure based on solving a convex localization problem, and means for determining a position of the wireless node using the selected positioning procedure.

Aspect 46. The apparatus of aspect 45, wherein the means for determining that the wireless node is arranged within the convex hull are configured to determine that the wireless node is arranged within the convex hull based on: obtaining a set of operation positions of at least four positioning devices and an estimate of the position of the wireless node; and determining that the estimated position of the wireless node is within the convex hull defined by the set of operation positions.

Aspect 47. The apparatus of aspect 46, wherein the means for obtaining the set of operation positions of the at least four positioning devices are configured to obtain the set of operation positions of the at least four positioning devices based on: receiving signaling from a wireless network associated with the at least four positioning devices, wherein the signaling comprises an indication of the set of operation positions of the at least four positioning devices.

Aspect 48. The apparatus of aspect 45, wherein the means for determining that the wireless node is arranged within the convex hull are configured to determine that the wireless node is arranged within the convex hull based on: receiving signaling from a wireless network associated with the at least four positioning devices, wherein the signaling comprises an indication that a positioning procedure based on solving a convex localization problem can be used.

Aspect 49. The apparatus of aspect 45, wherein the means for determining that the wireless node is arranged within the convex hull are configured to determine that the wireless node is arranged within the convex hull based on: determining a position of the wireless node based on a non-convex localization method; and determining that the determined position of the wireless node is located within the convex hull defined by the at least four positioning devices.

Aspect 50. The apparatus of aspect 49, wherein the non-convex localization method comprises satellite-based positioning.

Aspect 51. The apparatus of aspect 37, further comprising means for calculating the convex hull based on the obtained set of operation positions of the at least four positioning devices.

Aspect 52. A non-transitory computer-readable medium storing one or more instructions for determining a position of a wireless node in an operation area or volume, wherein the one or more instructions, when executed by one or more processors, cause the one or more processors to: determine that a wireless node is arranged within a convex hull defined by at least four positioning devices, and select based on the determining a positioning procedure based on solving a convex localization problem, and determine a position of the wireless node using the selected positioning procedure.

Aspect 53. A non-transitory computer-readable medium storing one or more instructions for wireless communication, wherein the one or more instructions, when executed by one or more processors, cause the one or more processors to: determine that a wireless node is arranged within a convex hull defined by at least four positioning devices, select based on the determining a positioning procedure based on solving a convex localization problem, and determine a position of the wireless node using the selected positioning procedure.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software.

It will be apparent that systems and/or methods described herein may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various aspects. In fact, many of these features may be combined in ways not specifically recited in the claims and/or dis-closed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchange-ably with "one or more." Where only one item is intended, the phrase "only one" or similar language is used. Also, as used herein, the terms "has," "have," "having," and/or the like are intended to be open-ended terms.

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

As used herein, the term "or" is an inclusive "or" unless limiting language is used relative to the alternatives listed. For example, reference to "X being based on A or B" shall be construed as including within its scope X being based on A, X being based on B, and X being based on A and B. In this regard, reference to "X being based on A or B" refers to "at least one of A or B" or "one or more of A or B" due to "or" being inclusive. Similarly, reference to "X being based on A, B, or C" shall be construed as including within its scope X being based on A, X being based on B, X being based on C, X being based on A and B, X being based on A and C, X being based on B and C, and X being based on A, B, and C. In this regard, reference to "X being based on A, B, or C" refers to "at least one of A, B, or C" or "one or more of A, B, or C" due to "or" being inclusive. As an example of limiting language, reference to "X being based on only one of A or B" shall be construed as including within its scope X being based on A as well as X being based on B, but not X being based on A and B.

What is claimed is:

1. A method for determining a position of a wireless node in an operation area or volume, the method comprising:
   receiving a set of reference signals from a set of at least four positioning devices, wherein the positioning devices are not arranged in a single plane;
   determining a signal propagation delay of each one of the set of reference signals;
   obtaining a position of each one of the set of positioning devices;
   solving a convex localization problem for the wireless node based at least in part on the determined signal propagation delay of each one of the set of reference signals and the position of each one of the set of positioning devices; and
   determining the position of the wireless node based at least in part on solving of the convex localization problem.

2. The method of claim 1, wherein the operation area or volume is comprised in a convex hull defined by the positions of the set of positioning devices.

3. The method of claim 1, wherein the positions of the set of positioning devices are obtained from a memory.

4. The method of claim 1, wherein the set of positioning devices comprises:
   a base station; and
   at least three reflecting surfaces, configured to reflect signals transmitted by or to the base station.

5. The method of claim 1, wherein the positions of each one of the set of positioning devices are received with the set of reference signals.

6. The method of claim 1, wherein solving the convex localization problem further comprises:
   determining a clock offset of the wireless node in relation to a synchronized time of the set of positioning devices.

7. The method of claim 6, wherein determining the clock offset comprises:

choosing a first clock offset and a second clock offset, wherein the second clock offset is smaller than the first clock offset;

determining an estimated clock offset based on a mean value of the first clock offset and the second clock offset;

solving the convex localization problem using the estimated clock offset; and if solving the convex localization problem yields a single solution, determining the position of the wireless node as the single solution; or if solving the convex localization problem yields no solution, updating the second clock offset to the estimated clock offset; or if solving the convex localization problem yields more than solution, updating the first clock offset to the estimated clock offset.

8. The method of claim 1, wherein solving the convex localization problem is based on a projection onto convex sets, POCS.

9. An apparatus for determining a position of a wireless node in an operation area or volume, the apparatus comprising:

a memory; and one or more processors coupled to the memory, the memory and the one or more processors configured to:

receive a set of reference signals from a set of at least four positioning devices, wherein the positioning devices are not arranged in a single plane;

determine a signal propagation delay of each one of the set of reference signals;

obtain a position of each one of the set of positioning devices;

solve a convex localization problem for the wireless node based at least in part on the determined signal propagation delay of each one of the set of reference signals and the position of each one of the set of positioning devices; and determine the position of the wireless node based at least in part on solving of the convex localization problem.

10. The apparatus of claim 9, wherein the operation area or volume is comprised in a convex hull defined by the positions of the set of positioning devices.

11. The apparatus of claim 9, wherein the positions of the set of positioning devices are obtained from the memory.

12. The apparatus of claim 9, wherein the set of positioning devices comprises:

a base station; and at least three reflecting surfaces, configured to reflect signals transmitted by or to the base station.

13. The apparatus of claim 9, wherein the positions of each one of the set of positioning devices are received with the set of reference signals.

14. The apparatus of claim 9, wherein the memory and the one or more processors are further configured to solve the convex localization problem based on:

determining a clock offset of the wireless node in relation to a synchronized time of the set of positioning devices.

15. The apparatus of claim 14, wherein the memory and the one or more processors are further configured to determine the clock offset based on:

choosing a first clock offset and a second clock offset, wherein the second clock offset is smaller than the first clock offset;

determining an estimated clock offset based on a mean value of the first clock offset and the second clock offset;

solving the convex localization problem using the estimated clock offset; and if solving the convex localization problem yields a single solution, determining the position of the wireless node as the single solution; or if solving the convex localization problem yields no solution, updating the second clock offset to the estimated clock offset; or if solving the convex localization problem yields more than solution, updating the first clock offset to the estimated clock offset.

16. The apparatus of claim 9, wherein the memory and the one or more processors are further configured to solve the convex localization problem based on a projection onto convex sets, POCS.

* * * * *